United States Patent
Arbel et al.

(10) Patent No.: US 12,253,936 B2
(45) Date of Patent: Mar. 18, 2025

(54) VALIDATING INTER-PARTITION COMMUNICATION IN MICROSERVICE DECOMPOSITION

(71) Applicant: International Business Machines Corporation, Armonk, NY (US)

(72) Inventors: Eli Arbel, Nesher (IL); Rachel Tzoref-Brill, Haifa (IL); Saurabh Sinha, Danbury, CT (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 17/177,149

(22) Filed: Feb. 16, 2021

(65) Prior Publication Data

US 2022/0261337 A1   Aug. 18, 2022

(51) Int. Cl.
*G06F 9/44* (2018.01)
*G06F 11/3668* (2025.01)

(52) U.S. Cl.
CPC ...... *G06F 11/3688* (2013.01); *G06F 11/3676* (2013.01); *G06F 11/3684* (2013.01); *G06F 11/3692* (2013.01)

(58) Field of Classification Search
CPC ............ G06F 11/3688; G06F 11/3676; G06F 11/3684; G06F 11/3692
See application file for complete search history.

(56) References Cited

U.S. PATENT DOCUMENTS

| | | | |
|---|---|---|---|
| 8,127,275 B1* | 2/2012 | Hampapuram | G06F 8/30 717/124 |
| 10,467,220 B2 | 11/2019 | Li | |
| 10,489,279 B2 | 11/2019 | Rajagopalan | |
| 10,698,806 B1* | 6/2020 | Scholz | G06F 11/3688 |
| 11,422,797 B1* | 8/2022 | Zhang | G06F 8/72 |
| 11,442,725 B1* | 9/2022 | Chawda | G06F 8/76 |
| 2007/0220370 A1* | 9/2007 | Branda | G06F 11/3688 714/49 |
| 2008/0184206 A1* | 7/2008 | Vikutan | G06F 11/3688 717/127 |

(Continued)

OTHER PUBLICATIONS

Felbinger et al., "Adapting Unit Tests by Generating Combinatorial Test Data," 2018 IEEE International Conference on Software Testing, Verification and Validation Workshops, Apr. 9-13, 2018, pp. 352-355.

(Continued)

*Primary Examiner* — Chat C Do
*Assistant Examiner* — Lenin Paulino
(74) *Attorney, Agent, or Firm* — Yee & Associates, P.C.

(57) ABSTRACT

A system, computer program product, and method are presented for executing a validation test on at least a portion of a refactored application. The refactored application is resident within a partitioned computing architecture including a plurality of partitions and communication between the partitions uses one or more boundary methods. The refactored application is at least partially similar to a transformed monolithic application. The method includes automatically generating one or more test sequences for exercising one or more functional behaviors for each boundary method of the one or more boundary methods.

16 Claims, 11 Drawing Sheets

(56) References Cited

U.S. PATENT DOCUMENTS

2020/0401506 A1* 12/2020 Sathianarayanan ... G06F 16/955

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.
Mishchuk, "Communication layer design for Ruby microservices," Medium.com, May 31, 2017, 10 pages. <https://medium.com/matic-insurance/communication-layer-design-for-ruby-microservices-98b388174aef>.
Savchenko et al., "Microservices validation: Mjolnirr platform case study," MIPRO 2015, May 25-29, 2015, pp. 235-240. <https://ieeexplore.ieee.org/abstract/document/7160271>.
Taylor, "4 Best Practices for Testing Microservices," Saucelabs.com, Nov. 28, 2018, 2 pages. <https://saucelabs.com/blog/4-best-practices-for-testing-microservices>.
Zamli et al., "Designing a Combinatorial Java Unit Testing Tool," Proceedings of the Third Lasted International Conference Advances in Computer Science and Technology, Apr. 2-4, 2007, 6 pages.

* cited by examiner

VALIDATING INTER-PARTITION COMMUNICATION IN MICROSERVICE DECOMPOSITION

BACKGROUND

The present disclosure relates to partitioning one or more applications, and, more specifically, to validating the inter-partition communication mechanisms between refactored classes within a partitioned microservice architecture decomposed from a monolithic applications.

Many known monolith-to-microservice (M2M) transformation applications are configured to partition a monolithic application into a plurality of refactored classes that are configured to be distributed within a microservices architecture. In some known computing architectures, one or more monolithic applications are resident therein, where the respective classes (a grouping of object-oriented constructs) within the monolithic applications are communicatively, and in some cases, operatively linked, and communications between the classes are executed through respective internal method calls. In contrast, the refactored classes that are distributed throughout the microservices architecture are communicatively, and in some cases, operatively coupled through one or more communications protocols, e.g., application programming interfaces (APIs) that are more complex than internal method calls. Validation of the transformed, i.e., partitioned application necessarily includes validating proper implementation and operation of the communications protocols between the refactored classes within the partitioned application such that the functionality of the partitioned application is substantially equivalent to the functionality of the monolithic application.

SUMMARY

A system, computer program product, and method are provided for validating the inter-partition communication mechanisms between refactored classes within a partitioned microservice architecture.

In one aspect, a computer system is provided for validating the inter-partition communication mechanisms between refactored classes within a partitioned microservice architecture. The system includes a partitioned computing architecture including a plurality of partitions. Each partition of the plurality of partitions includes one or more processing devices and at least one memory device operably coupled to the one or more processing devices. The one or more processing devices are configured to execute a validation test on at least a portion of a refactored application. The refactored application is resident within the partitioned computing architecture and communication between the partitions uses one or more boundary methods. The refactored application is at least partially similar to a transformed monolithic application. The one or more processing devices are further configured to automatically generate one or more test sequences for exercising one or more functional behaviors for each boundary method of the one or more boundary methods.

In another aspect, a computer program product is provided for validating the inter-partition communication mechanisms between refactored classes within a partitioned microservice architecture. The computer program product includes one or more computer readable storage media, and program instructions collectively stored on the one or more computer storage media. The product also includes program instructions to execute a validation test on at least a portion of a refactored application. The refactored application is resident within a partitioned computing architecture including a plurality of partitions and communication between the partitions uses one or more boundary methods. The refactored application is at least partially similar to a transformed monolithic application. The program instructions further include program instructions to automatically generate one or more test sequences for exercising one or more functional behaviors for each boundary method of the one or more boundary methods.

In yet another aspect, a computer-implemented method is provided for validating the inter-partition communication mechanisms between refactored classes within a partitioned microservice architecture. The refactored application is resident within a partitioned computing architecture including a plurality of partitions and communication between the partitions uses one or more boundary methods. The refactored application is at least partially similar to a transformed monolithic application. The method includes automatically generating one or more test sequences for exercising one or more functional behaviors for each boundary method of the one or more boundary methods.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
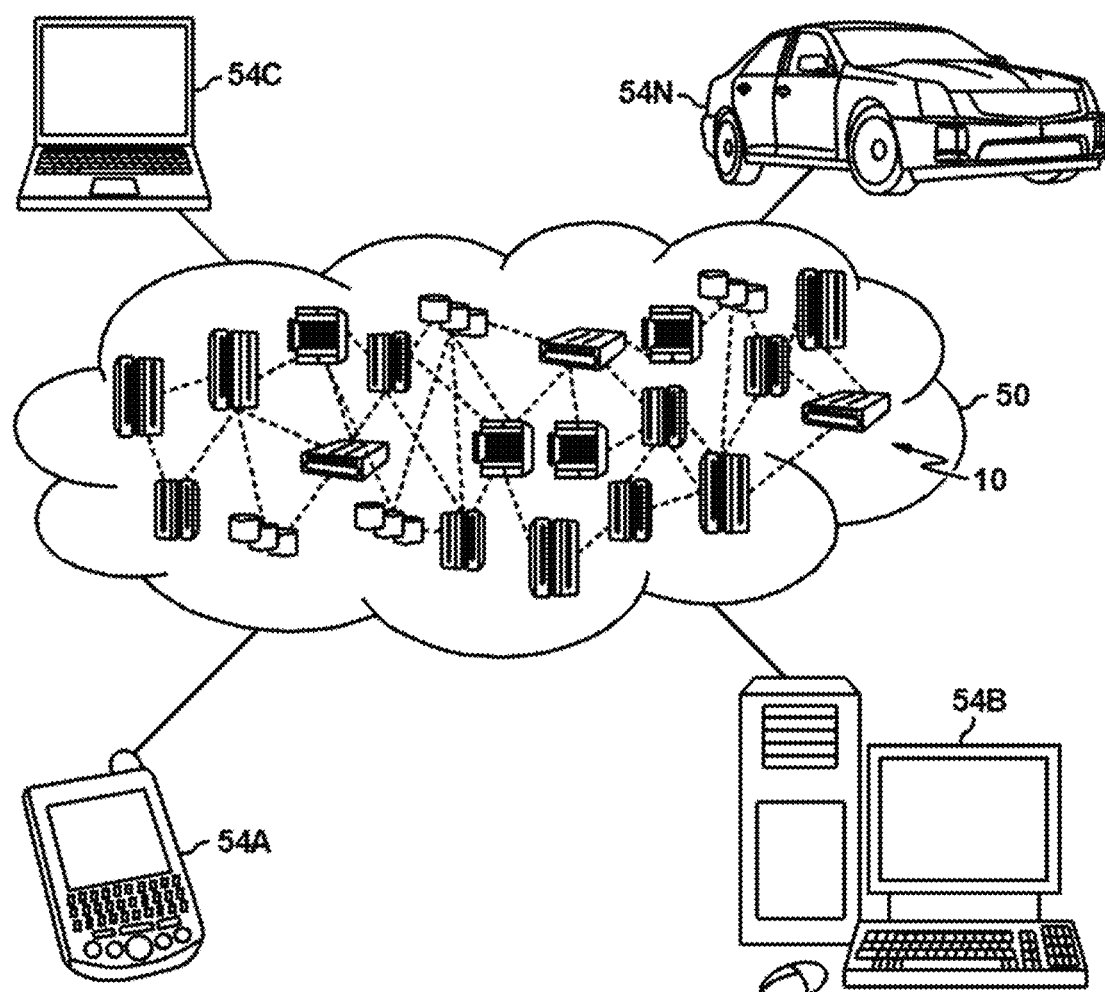
FIG. 1 is a schematic diagram illustrating a cloud computer environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments. In addition, it will be appreciated that, although specific embodiments have been described herein for purposes of illustration, various modifications may be made without departing from the spirit and scope of the embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
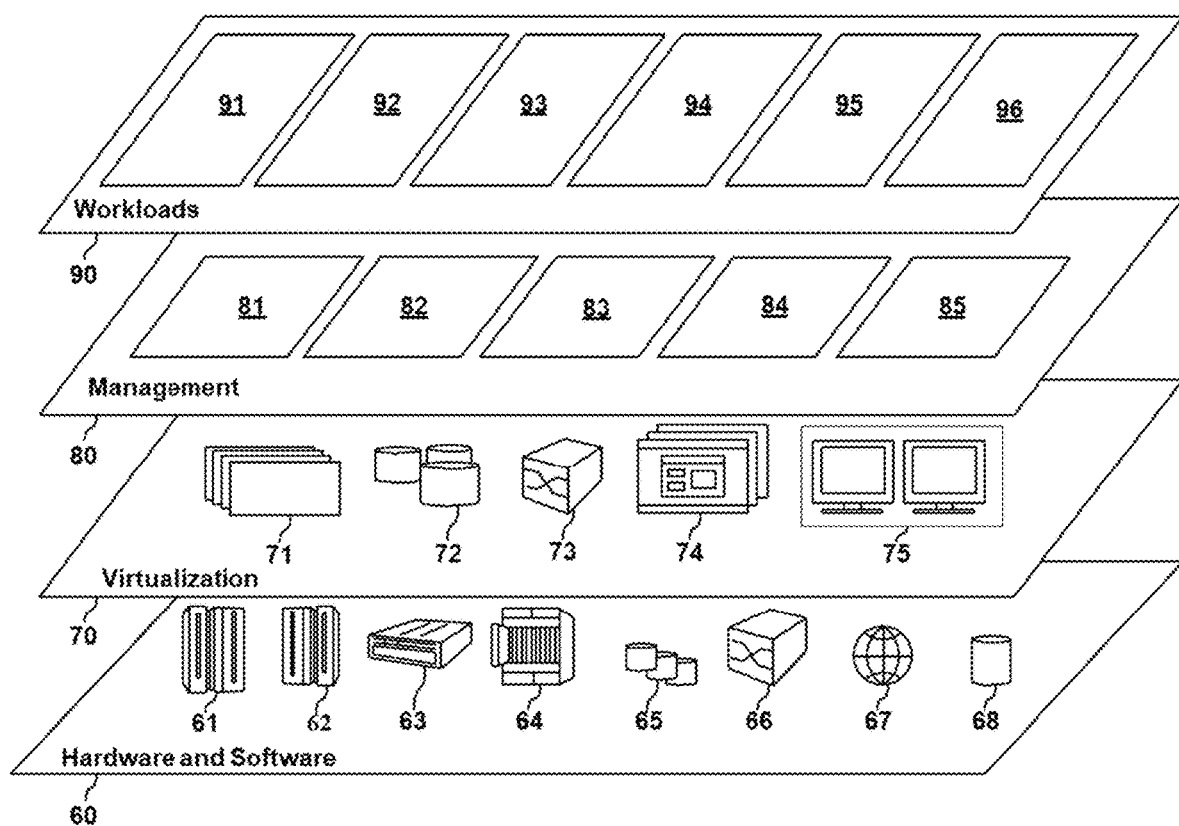
FIG. 2 is a block diagram illustrating a set of functional abstraction model layers provided by the cloud computing environment, in accordance with some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and validating the interpartition communication mechanisms between refactored classes within a partitioned microservices system architecture 96.

Figure 3:
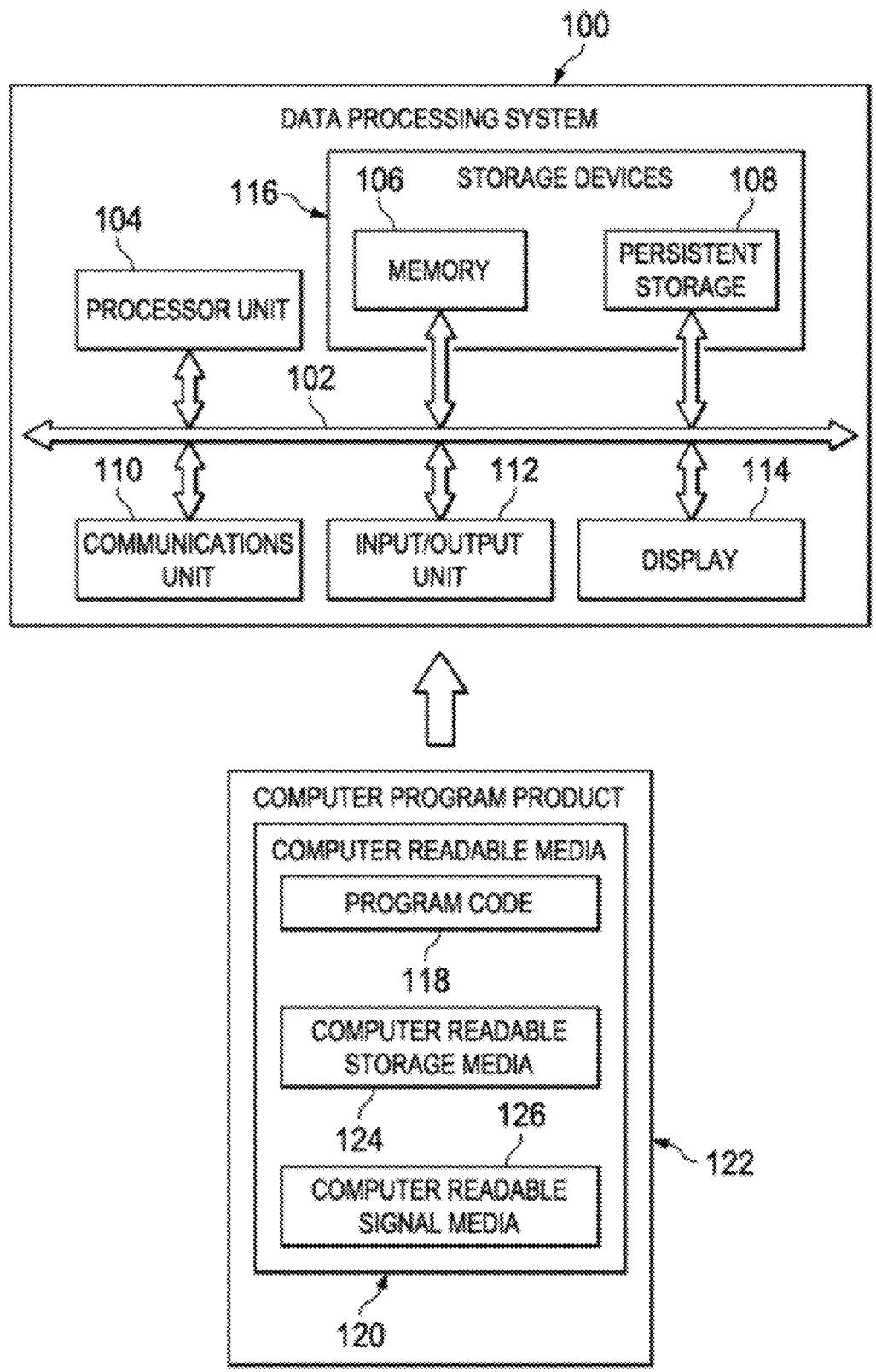
FIG. 3 is a block diagram illustrating a computer system/server that may be used as a cloud-based support system, to implement the processes described herein, in accordance with some embodiments of the present disclosure.

Referring to FIG. 3, a block diagram of an example data processing system, herein referred to as computer system 100, is provided. The computer system 100 may be embodied in a computer system/server in a single location, or in at least one embodiment, may be configured in a cloud-based system sharing computing resources. For example, and without limitation, the computer system 100 may be used as a cloud computing node 10.

Aspects of the computer system 100 may be embodied in a computer system/server in a single location, or in at least one embodiment, may be configured in a cloud-based system sharing computing resources as a cloud-based support system, to implement the system, tools, and processes described herein. The computer system 100 is operational with numerous other general purpose or special purpose computer system environments or configurations. Examples of well-known computer systems, environments, and/or configurations that may be suitable for use with the computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computer system 100 may be described in the general context of computer system-executable instructions, such as program modules, being executed by the computer system 100. Generally, program modules may include routines, programs, objects, components, logic, data structures, and so on that perform particular tasks or implement particular abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 is shown in the form of a general-purpose computing device. The components of the computer system 100 may include, but are not limited to, one or more processors or processing devices 104 (sometimes referred to as processors and processing units), e.g., hardware processors, a system memory 106 (sometimes referred to as a memory device), and a communications bus 102 that couples various system components including the system memory 106 to the processing device 104. The communications bus 102 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 100 typically includes a variety of computer system readable media. Such media may be any available media that is accessible by the computer system 100 and it may include both volatile and non-volatile media, removable and non-removable media. In addition, the computer system 100 may include one or more persistent storage devices 108, communications units 110, input/output (I/O) units 112, and displays 114.

The processing device 104 serves to execute instructions for software that may be loaded into the system memory 106. The processing device 104 may be a number of processors, a multi-core processor, or some other type of processor, depending on the particular implementation. A number, as used herein with reference to an item, means one or more items. Further, the processing device 104 may be implemented using a number of heterogeneous processor systems in which a main processor is present with secondary processors on a single chip. As another illustrative example, the processing device 104 may be a symmetric multi-processor system containing multiple processors of the same type.

The system memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The system memory 106, in these examples, may be, for example, a random access memory or any other suitable volatile or non-volatile storage device. The system memory 106 can include computer system readable media in the form of volatile memory, such as random access memory (RAM) and/or cache memory.

The persistent storage 108 may take various forms depending on the particular implementation. For example, the persistent storage 108 may contain one or more components or devices. For example, and without limitation, the persistent storage 108 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the communication bus 102 by one or more data media interfaces.

The communications unit 110 in these examples may provide for communications with other computer systems or devices. In these examples, the communications unit 110 is a network interface card. The communications unit 110 may provide communications through the use of either or both physical and wireless communications links.

The input/output unit 112 may allow for input and output of data with other devices that may be connected to the computer system 100. For example, the input/output unit 112 may provide a connection for user input through a keyboard, a mouse, and/or some other suitable input device. Further, the input/output unit 112 may send output to a printer. The display 114 may provide a mechanism to display information to a user. Examples of the input/output units 112 that facilitate establishing communications between a variety of devices within the computer system 100 include, without limitation, network cards, modems, and input/output interface cards. In addition, the computer system 100 can communicate with one or more networks such as a local area network (LAN), a general wide area network (WAN), and/or a public network (e.g., the Internet) via a network adapter (not shown in FIG. 3). It should be understood that although not shown, other hardware and/or software components could be used in conjunction with the computer system 100. Examples of such components include, but are not limited to: microcode, device drivers, redundant processing units, external disk drive arrays, RAID systems, tape drives, and data archival storage systems.

Instructions for the operating system, applications and/or programs may be located in the storage devices 116, which are in communication with the processing device 104 through the communications bus 102. In these illustrative examples, the instructions are in a functional form on the persistent storage 108. These instructions may be loaded into the system memory 106 for execution by the processing device 104. The processes of the different embodiments may be performed by the processing device 104 using computer implemented instructions, which may be located in a memory, such as the system memory 106. These instructions are referred to as program code, computer usable program code, or computer readable program code that may be read and executed by a processor in the processing device 104. The program code in the different embodiments may be embodied on different physical or tangible computer readable media, such as the system memory 106 or the persistent storage 108, and may be physically associated with one or more other devices and access through the I/O units 112.

The program code 118 may be located in a functional form on the computer readable media 120 that is selectively removable and may be loaded onto or transferred to the computer system 100 for execution by the processing device 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the computer system 100. In some instances, the computer readable storage media 124 may not be removable from the computer system 100.

Alternatively, the program code 118 may be transferred to the computer system 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or computer system through the computer readable signal media 126 for use within the computer system 100. For instance, program code stored in a computer readable storage medium in a server computer system may be downloaded over a network from the server to the computer system 100. The computer system providing the program code 118 may be a server computer, a client computer, or some other device capable of storing and transmitting the program code 118.

The program code 118 may include one or more program modules (not shown in FIG. 3) that may be stored in system memory 106 by way of example, and not limitation, as well as an operating system, one or more application programs, other program modules, and program data. Each of the operating systems, one or more application programs, other program modules, and program data or some combination thereof, may include an implementation of a networking environment. The program modules of the program code 118 generally carry out the functions and/or methodologies of embodiments as described herein.

The different components illustrated for the computer system 100 are not meant to provide architectural limitations to the manner in which different embodiments may be implemented. The different illustrative embodiments may be implemented in a computer system including components in addition to or in place of those illustrated for the computer system 100.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

At least some known computing systems are configured to maintain and execute one or more monolithic applications, i.e., a software application in which the user interface and data access code are combined into a single program from a single platform, and the subject monolithic software application is self-contained and independent from other computing applications. In some known monolithic computing architectures, one or more such monolithic applications are resident therein, where the respective classes (a grouping of object-oriented constructs) within each respective monolithic application are communicatively, and in some cases, operatively linked, and communications between the classes are executed through respective internal method calls.

In contrast to the previously described monolithic computing architectures, many known microservices system architectures include a plurality of independent services, each service being responsible for implementing a certain feature. In some embodiments, the microservices system architecture may include a unitary computing device with a single memory device and a single processing device. In some embodiments, the microservices system architecture may include a unitary computing device with one or more of a plurality of memory devices and a plurality of processing devices. In some embodiments, the microservices system architecture may include a plurality of computing devices with one or more of a plurality of memory devices and a plurality of processing devices. In some embodiments, the microservices system architecture may include a plurality of computing devices within a cloud computing environment similar to those discussed with respect to FIGS. 1 and 2.

In at least some embodiments of the monolithic applications, a transition of a monolithic application to a plurality of microservices is preferred over designing, implementing, and placing into production a new microservices-based application that substantially replicates the functionality and operation of the legacy monolithic application. In such embodiments, costs and timeliness are at least two factors that indicate that a transformation of the monolithic application to a microservices configuration suitable for one or more microservices system architectures is preferred to a total redesign and implementation for such microservices system architectures.

In some embodiments, migrations of monolithic applications to such microservices system architectures are executed through one or more monolith-to-microservice (M2M) transformation applications that are configured to partition a monolithic application and its respective classes into a plurality of refactored classes that are configured to be distributed within a microservices system architecture. At least some of these distributions of the refactored classes are at least partially based on criteria such as, and without limitation, relevant groupings of the refactored classes with data dependencies to generate natural seams-based groupings. At least some of these M2M transformation applications partition the monolithic applications into the transformed application through refactoring the code across the respective microservices system architecture substantially automatically, i.e., with little to no user interaction. The partitions of the microservices system architecture include, without limitation, the various processing devices and memory devices and their respective computing devices distributed throughout the microservices system architecture within their respective partitions, thereby defining a partitioned microservices system architecture.

In general, the refactored classes within the microservices systems are substantially identical to the respective classes within the monolithic application. However, in contrast to the respective monolithic application that uses internal method calls to communicate between the respective classes, the refactored classes that are distributed throughout the microservices system architecture are communicatively, and in some cases, operatively coupled through one or more communications protocols that include, without limitation, RESTful application programming interfaces (APIs), i.e., REST APIs that are inherently more complex than the aforementioned internal method calls. REST is an acronym for "representational state transfer" that allows requesting systems to access and manipulate textual representations of web resources by using a uniform and predefined set of stateless operations. REST APIs use an architectural style and approach to communications often used in web services development that leverages hypertext transfer protocol (HTTP) to request and access data for the respective operations. In general, at least one reason why the internal method calls of the monolithic application will not function in the partitioned computing environment is that the internal method calls are typically not configured to communicate across multiple platforms with varying memory and processing architectures and, therefore, such internal method calls are not configured to communicate across the respective varying communications protocols across the multiple communications channels between the multiple computing platforms and environments in the respective microservices system architecture. In contrast, the REST APIs are typically configured to facilitate communications across varying platforms regardless of the architecture of each platform.

In at least some embodiments, once the transformation from a monolithic application to the transformed application, i.e., the partitioned application with the respective refactored classes in their respective partitions, is completed, validation of the transformed application is typically executed. The primary purpose of the validation process is to provide some level of assurance that the functionality of the transformed application is substantially similar to the functionality of the original monolithic application. More specifically, a determination needs to be made that the refactored application is substantially functionally equivalent to the monolithic application. Such validation of the transformed application necessarily includes validating proper implementation and operation of the communications protocols between the refactored classes within the transformed application such that the aforementioned functionality of the transformed application is substantially functionally equivalent to the functionality of the monolithic application.

A system, computer program product, and method are disclosed and described herein directed toward validating the inter-partition communication mechanisms between refactored classes within a transformed, i.e., partitioned application, within a partitioned microservices system architecture. In some embodiments, such validation includes automatically generating tests for exercising the functional behavior, i.e., serialization and deserialization behavior, for each boundary method, i.e., for each method that is transmitted between communicatively coupled partitions through a class proxy, where such boundary methods are distinguished from traditional method calls between classes across a unitary monolithic application within a monolithic computing architecture. Also, in some embodiments, in addition to automatically executing testing at an individual class level between the partitions through the proxy class, testing may also be automatically executed through a sequence of method calls within a respective partition to set up the respective object's state in which the respective boundary (proxy) method will be called, thereby increasing the speed and efficiency of testing.

Further, in some embodiments of the system, computer program product, and method disclosed and described herein, an optimized vector of multiple parameter types for respective method invocations is generated for each respective boundary (proxy) method that will be called, thereby facilitating the aforementioned setting-up of a respective object's state through automatically assigning specific types to the respective parameters, i.e., through the use of combinatorial testing features. More specifically, in one or more embodiments, a combinational test design (CTD) model is automatically created to facilitate attaining a test coverage objective of testing across one or more combinations of parameter types. Furthermore, in at least one embodiment, the aforementioned CTD model may also take into account particular parameter combinations that induce different return types as a function of such parameter combinations, thereby facilitating broad test coverage for each optimized vector of multiple parameter types. In addition, in some embodiments, an optimized n-way test covering array is generated from the model, and the n-way test covering array facilitates generating concrete JUnit test cases by leveraging one or more automatic test generators. The n-way covering array is optimized in that the array contains the fewest number of rows that cover all n-way interactions among the model parameters.

Moreover, in some embodiments of the system, computer program product, and method disclosed and described herein, automatic assertion generation is employed through using differential testing to automatically create the respective assertions. The differential testing techniques as described herein not only compare behaviors of the transformed application against behaviors of the monolithic application, they facilitate automatically applying the results of those differential testing techniques to facilitate decreasing the time of, and increasing the effectiveness of, detecting and correcting bugs, i.e., programming and/or communication errors, as well as facilitate documenting the inner workings of a program to enhance transparency and maintainability thereof. Accordingly, the processes described herein facilitate optimized test quality because the coverage targets code parts that have changed during the refactoring process.

Therefore, as described herein, a high quality and fully-automated solution for testing a refactored application which was transformed from a monolithic application to a microservices system architecture is presented. Specifically, components such as automatic test generation, differential testing with automatic assertion generation, and combinatorial testing as key features are used to target full coverage of code parts that have been affected by the refactoring process in a fully automated manner. More specifically, information about the refactoring process to target specific methods in specific ways considering the effects of the refactoring process is utilized through targeting specific boundary methods and invoking them with different parameter type combinations for inducing different return types and using combinatorial testing to facilitate sufficient cross product coverage.

Accordingly, the system, computer program product, and method disclosed and described herein are configured to provide validation that the respective transformation mechanism works as expected so that the modernized application is functionally equivalent to its monolithic version, including the inter-partition communications mechanisms between the partitioned classes.

Figure 4:
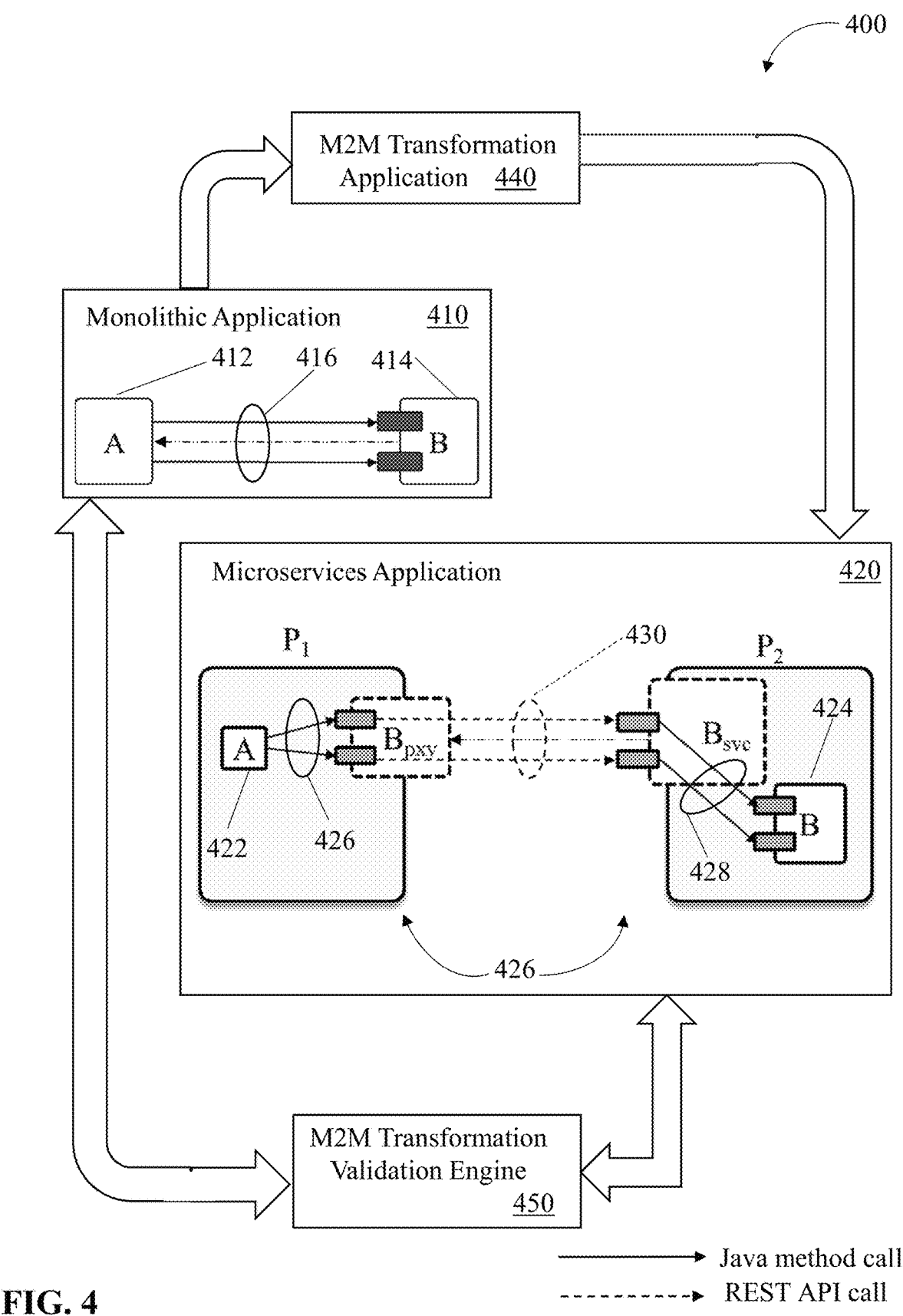
FIG. 4 is a block diagram illustrating a high-level view of a computing system architecture configured to transform a monolithic application to a refactored application and validate the communications between the classes in the refactored application, in accordance with some embodiments of the present disclosure.

Referring to FIG. 4, a block diagram is presented illustrating a high-level view of a computing system architecture 400 configured to transform a monolithic application 410 to a refactored application 420 through a M2M transformation application 440, where the refactored application 420 may be validated through a M2M transformation validation engine 450. As shown in FIG. 4, the monolithic application 410, the refactored application 420, the M2M transformation application 440, and the M2M transformation validation engine 450 are communicatively and operably coupled to each other.

In some embodiments, each of the monolithic application 410, the refactored application 420, the M2M transformation application 440, and the M2M transformation validation engine 450 (sometimes also referred to as "the engine 450") are resident within respective individual computing environments, i.e., separate computing devices across a network. For example, and without limitation, in some embodiments, the three applications 410, 420, and 440, and the engine 450 are resident on four separate servers 63 (shown in FIG. 2), where each server 63 is dedicated to a single application 410, 420, and 440, and the engine 450. In some embodiments, each of the monolithic application 410, a portion of the refactored application 420, the M2M transformation application 440, and the M2M transformation validation engine 450 are all resident within a single computing device, e.g., a sole server 63 (shown in FIG. 2). In general, as discussed further herein, the refactored application 420 is partitioned through multiple devices. Accordingly, the three applications 410, 420, and 440, and the engine 450 are resident on any computing devices in any configuration that enables operation of the respective applications 410, 420, and 440, and the engine 450 as described herein.

In one or more embodiments, the monolithic application 410 includes a plurality of classes embedded therein, for example, and without limitation, a first class object, i.e., a class A 412 and a second class object, i.e., a class B 414. Class A 412 and class B 414 are communicatively, and in some cases, operatively linked though one or more communications channels 416 that facilitate transmission of method calls and passing of parameters and arguments (shown in FIG. 4 as solid arrows), and transmitting feedback (shown as dashes and dots) therebetween. The communications, including the method calls, are maintained internal to the monolithic application 410. The number of 2 classes in non-limiting.

In at least some embodiments, the M2M transformation application 440 transforms the monolithic application 410 into a plurality of refactored classes within the microservices application 420, for example, and without limitation, a refactored class A 422 and a refactored class B 424 that are substantially similar to the class A 412 and class B 414, respectively, in the monolithic application 410. The refactored class A 422 is resident within a first partition $P_1$ and the refactored class B 424 is resident within a second partition $P_2$, thereby at least partially defining a partitioned microservices system architecture 426. In one embodiment, the first partition $P_1$ and the second partition $P_2$ are separate computing devices. The numbers of 1 class per partition and 2 partitions are non-limiting. The partitioned microservices system architecture 426 includes any number of classes distributed throughout any number of partitions that enables operation of the microservices application 420 as described herein. At least a portion of the distributions of the refactored classes A 422 and B 424 are at least partially based on criteria such as, and without limitation, relevant groupings of the refactored classes A 422 and 424 with data dependencies to generate natural seams-based groupings within the respective partitions $P_1$ and $P_2$.

In some embodiments, the microservices application 420 also includes a class proxy object, i.e., $B_{pxy}$ resident within the first partition $P_1$ that is communicatively and operatively linked to the refactored class A 422 though one or more communications channels 426 that facilitate transmission of method calls and passing of parameters and arguments (shown in FIG. 4 as solid arrows), and transmitting feedback (not shown in partition $P_1$) therebetween. The respective method calls are maintained internal to the partition $P_1$ since, in general, at least one reason why the internal method calls of the monolithic application 410 will not function in the partitioned microservices system architecture 426 external to the first partition $P_1$ is that the internal method calls are typically not configured to communicate across multiple platforms with varying memory and processing architectures and, therefore, the internal method calls are not configured to communicate across the respective varying communications protocols across the multiple communications channels between the multiple computing platforms and environments in the partitioned microservices system architecture 426.

In at least some embodiments, the microservices application 420 further includes a class service object, i.e., $B_{svc}$ resident within the second partition $P_2$ that is communicatively and operatively linked to the refactored class B 424 though one or more communications channels 428 that facilitate transmission of method calls and passing of parameters and arguments (shown in FIG. 4 as solid arrows), and transmitting feedback (not shown in partition $P_2$) therebetween. Similar to the method class within the partition $P_1$, the respective method calls are maintained internal to the partition $P_2$. In addition, the $B_{pxy}$ and the $B_{svc}$ are communicatively and operatively coupled through one or more communications channels 430 that are configured for using one or more partitional communication protocols to communicate between their respective partitions, for example, and without limitation, such protocols as REST APIs.

In some embodiments, the M2M transformation application 440 creates a plurality of objects to facilitate use of the REST APIs to invoke the respective boundary methods, e.g., and without limitation, class proxy objects such as the $B_{pxy}$ and class service objects such as the $B_{svc}$. A boundary method is transmitted from the proxy object $B_{pxy}$ to the service object $B_{svc}$ across the communications channels 430 thereby passing the respective parameters and arguments from the class A 422 to class B 424 to execute the serialization and deserialization behavior for the boundary method. The service object $B_{svc}$ is configured to ensure the execution of the boundary methods by the class B 424 as required by the incoming REST API call and passing the results back to the proxy object $B_{pxy}$ and then the class A 422. The class A 422 and the class B 424 operate in a manner substantially consistent with the respective functionality of the class A 412 and class B 414 as in the monolithic application 410. In general, if a refactoring bug is introduced into the refactored application, it will most likely be observed through an inter-partition service call and the state of the objects passed as arguments in the call.

In embodiments, once the refactored application 420 is generated, the M2M transformation validation engine 450 is used to test the refactored application 420, where such testing is the focus of the present disclosure. The engine 450 includes application such as, and without limitation, one or more static analysis application, one or more combinatorial test design (CTD) applications with one or more embedded CTD model builders, and automatic test generators (ATGs), Referring to FIG. 5A, a block diagram is presented illustrating a first portion 501 of a computer system 500 that is configured to manage and execute operations associated with the applications 410, 420, and 440, and the engine 450 as shown and discussed with respect to FIG. 4 and to be further discussed with respect to FIG. 5A. In at least some embodiments, the first portion 501 is a first computing device 501. Therefore, the terms "first portion 501" and "first computing device 501" are used interchangeably herein. The computer system 500 includes one or more processing devices 504 (only one shown) communicatively and operably coupled to one or more memory devices 506 (only one shown). The computer system 500 also includes a data storage system 508 that is communicatively coupled to the processing device 504 and memory device 506 through a communications bus 502. In one or more embodiments, the communications bus 502, the processing device 504, the memory device 506, and the data storage system 508 are similar to their counterparts shown in FIG. 3, i.e., the communications bus 102, the processing device 104, the system memory 106, and the persistent storage devices 108, respectively. The computer system 500 further includes one or more input devices 510 and one or more output devices 512 communicatively and operatively coupled to the communications bus 502. In addition, the computer system 500 includes one or more Internet connections 514 (only one shown) communicatively coupled to the cloud 516 through the communications bus 502, and one or more network connections 518 (only one shown) communicatively coupled to one or more other computing devices 520 through the communications bus 502.

In some embodiments, each of the monolithic application 522, the M2M transformation application 524, and the M2M transformation validation engine 526 (sometimes referred to as "the engine 526") are resident within the memory device 506, where the applications 522 and 524, and the engine 526 are substantially similar to their respective counterparts of the monolithic application 410, the M2M transformation application 440, and the M2M transformation validation engine 450 as shown in FIG. 4. In addition, in some embodiments, a first portion 528 of the refactored application 420 (from FIG. 4) is also resident within the memory device 506.

Figure 5A:
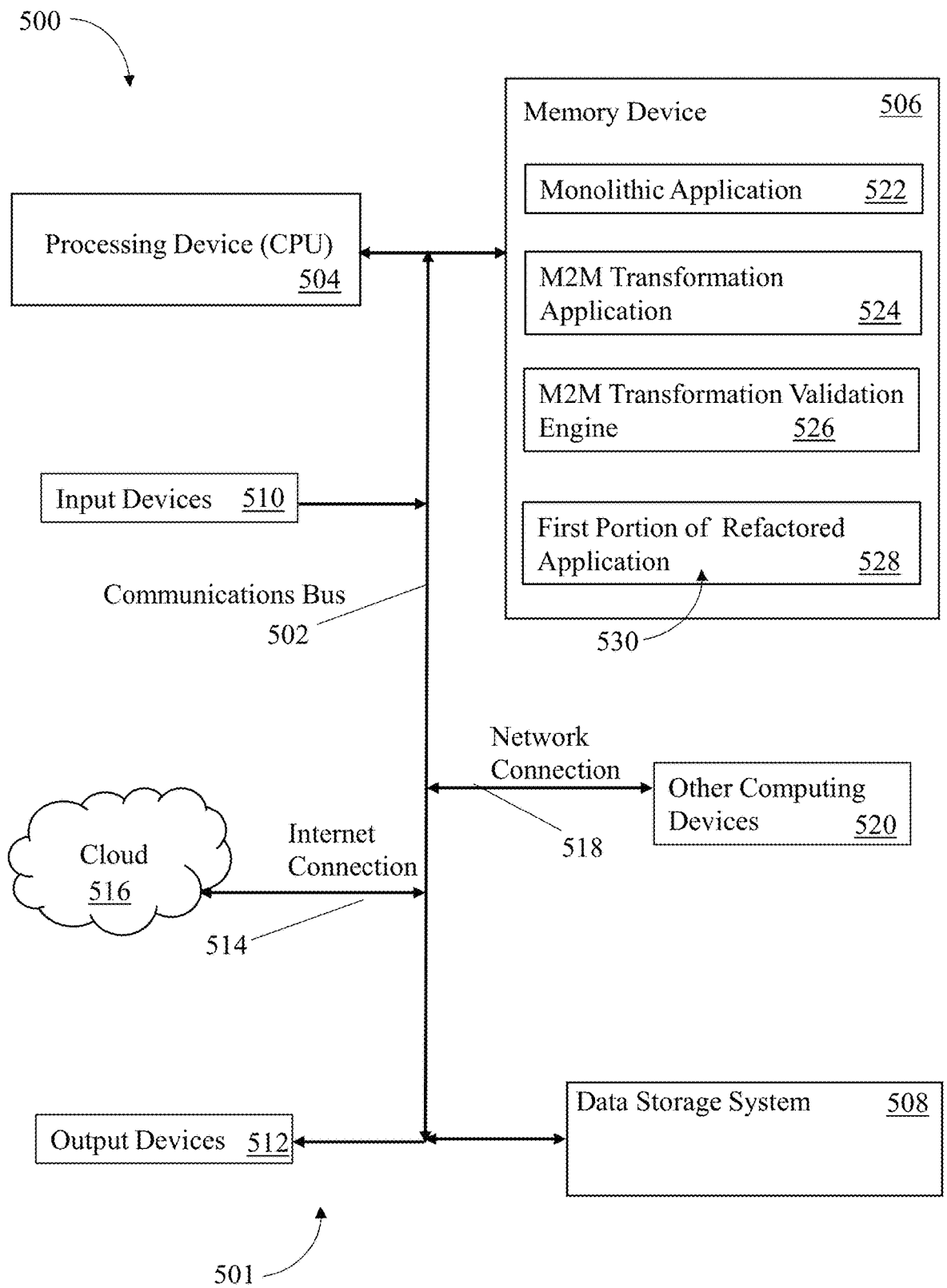
FIG. 5A is a block diagram illustrating a first portion of a computer system configured for managing and executing operations associated with the applications as shown and discussed with respect to FIG. 4, in accordance with some embodiments of the present disclosure.
Figure 5B:
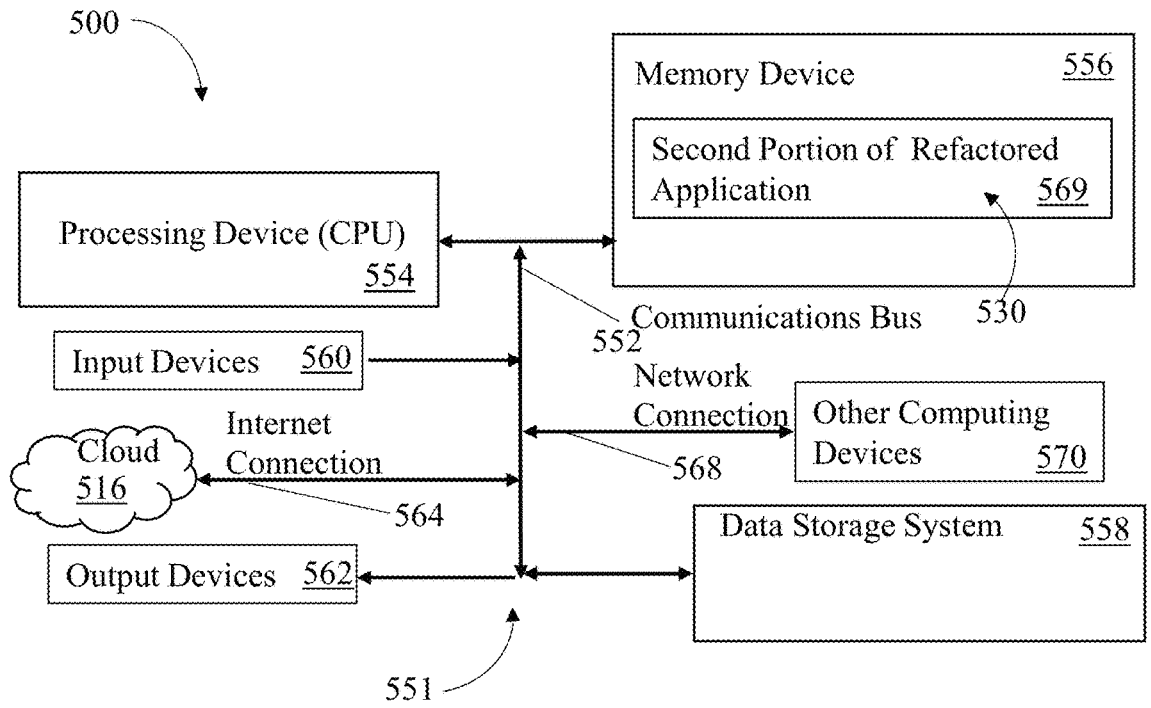
FIG. 5B is a block diagram illustrating a second portion of the computer system shown in FIG. 5A, in accordance with some embodiments of the present disclosure.

Referring to FIG. 5B, a block diagram is presented illustrating a second portion 551 of the computer system 500 continued from FIG. 5A. The second portion 551 of the computer system 500 includes one or more processing devices 554 (only one shown), one or more memory devices 556 (only one shown), a data storage system 558, a communications bus 552, one or more input devices 560, one or more output devices 562, one or more Internet connections 564 (only one shown) communicatively coupled to the cloud 516, and one or more network connections 568 (only one shown) communicatively coupled to one or more other computing devices 570, including the first computing device 501. The second portion 551 of the computer system 500 further includes a second portion 569 of the refactored application 530. Unless otherwise stated, the components of the second portion 551 are substantially similar to those similarly-identified components in the first portion 501. In at least some embodiments, the second portion 551 is a second computing device 551. Therefore, the terms "second portion 551" and "second computing device 551" are used interchangeably herein.

Figure 5C:
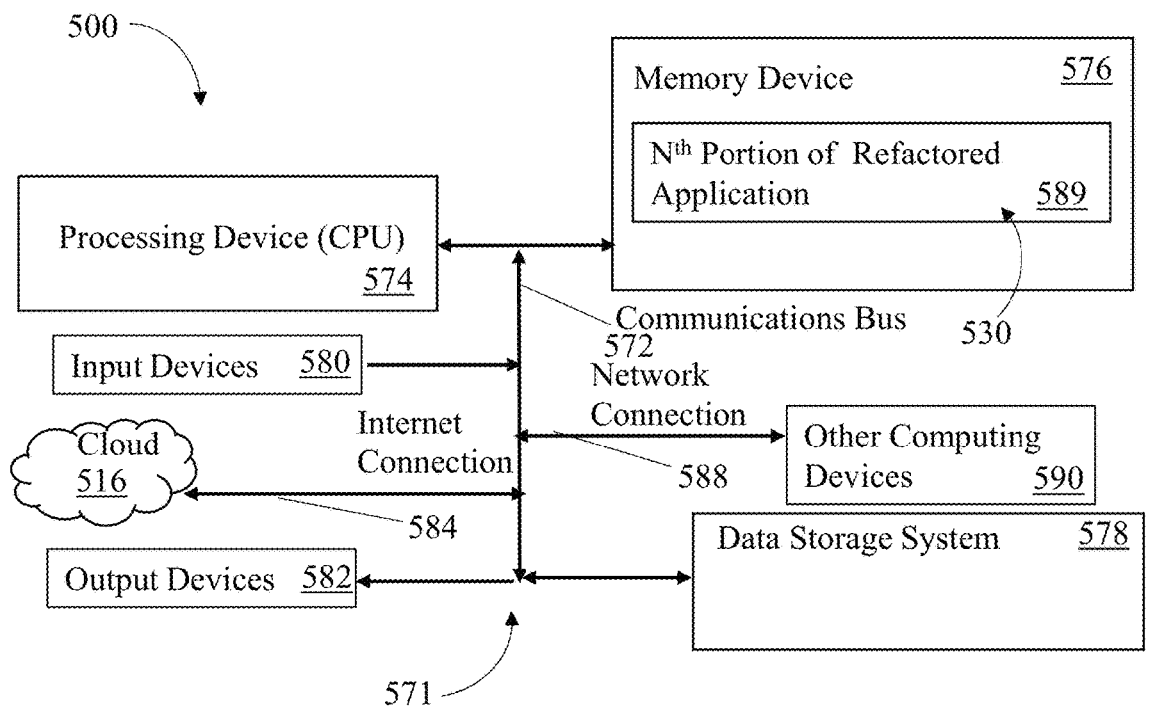
FIG. 5C is a block diagram illustrating an $N^{th}$ portion of the computer system shown in FIGS. 5A and 5B, in accordance with some embodiments of the present disclosure.

Referring to FIG. 5C, a block diagram is presented illustrating an $N^{th}$ portion 571 of the computer system 500 continued from FIGS. 5A and 5B. The $N^{th}$ portion 571 of the computer system 500 includes one or more processing devices 574 (only one shown), one or more memory devices 576 (only one shown), a data storage system 578, a communications bus 572, one or more input devices 580, one or more output devices 582, one or more Internet connections 584 (only one shown) communicatively coupled to the cloud 516, and one or more network connections 588 (only one shown) communicatively coupled to one or more other computing devices 590, including the first computing device 501 and the second computing device 551. The $N^{th}$ portion 571 of the computing system 500 further includes an $N^{th}$ portion 589 of the refactored application 530, where N represents any integer greater than 2. Unless otherwise stated, the components of the $N^{th}$ portion 571 are substantially similar to those similarly-identified components in the first portion 501 and the second portion 551. In at least some embodiments, the $N^{th}$ portion 571 is an $N^{th}$ second computing device 571. Therefore, the terms "$N^{th}$ portion 571" and "$N^{th}$ computing device 571" are used interchangeably herein. In one or more embodiments, and as shown in FIGS. 5A through 5C, the computer system 500 and the associated refactored application 530 are distributed across the first computing device 501, the second computing device 551, and through the $N^{th}$ computing device 571. Accordingly, the first portion 528, second portion 569, and the $N^{th}$ portion 589 of the refactored application 530 are communicatively and operably coupled through one or more of the Internet connections 514, 564, and 586 and the cloud 516, and the network connections 518, 568, and 588.

Figure 6:
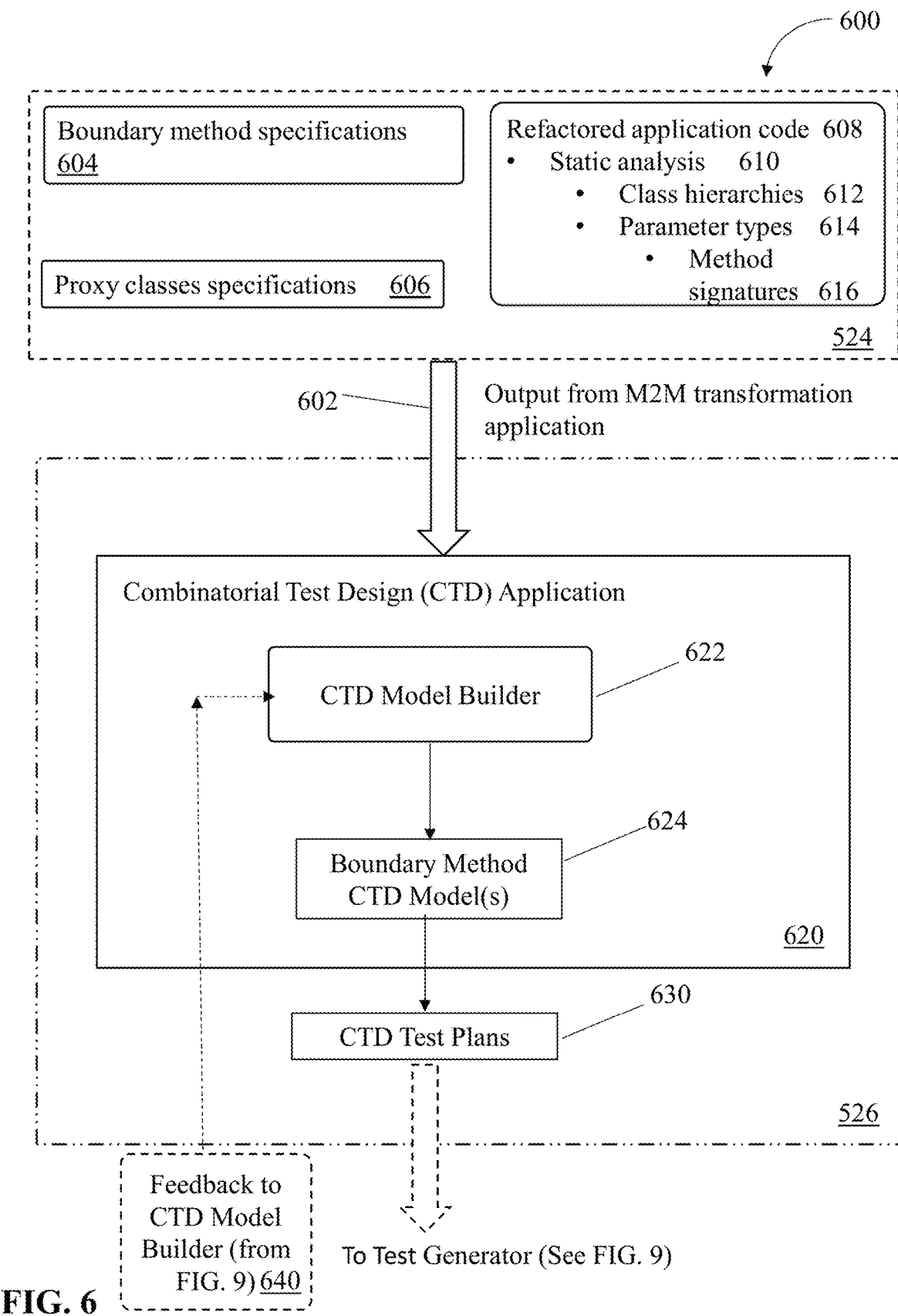
FIG. 6 is a block diagram illustrating at least a first portion of a monolith-to-microservice (M2M) transformation validation engine, in accordance with some embodiments of the present disclosure.
Figure 7:
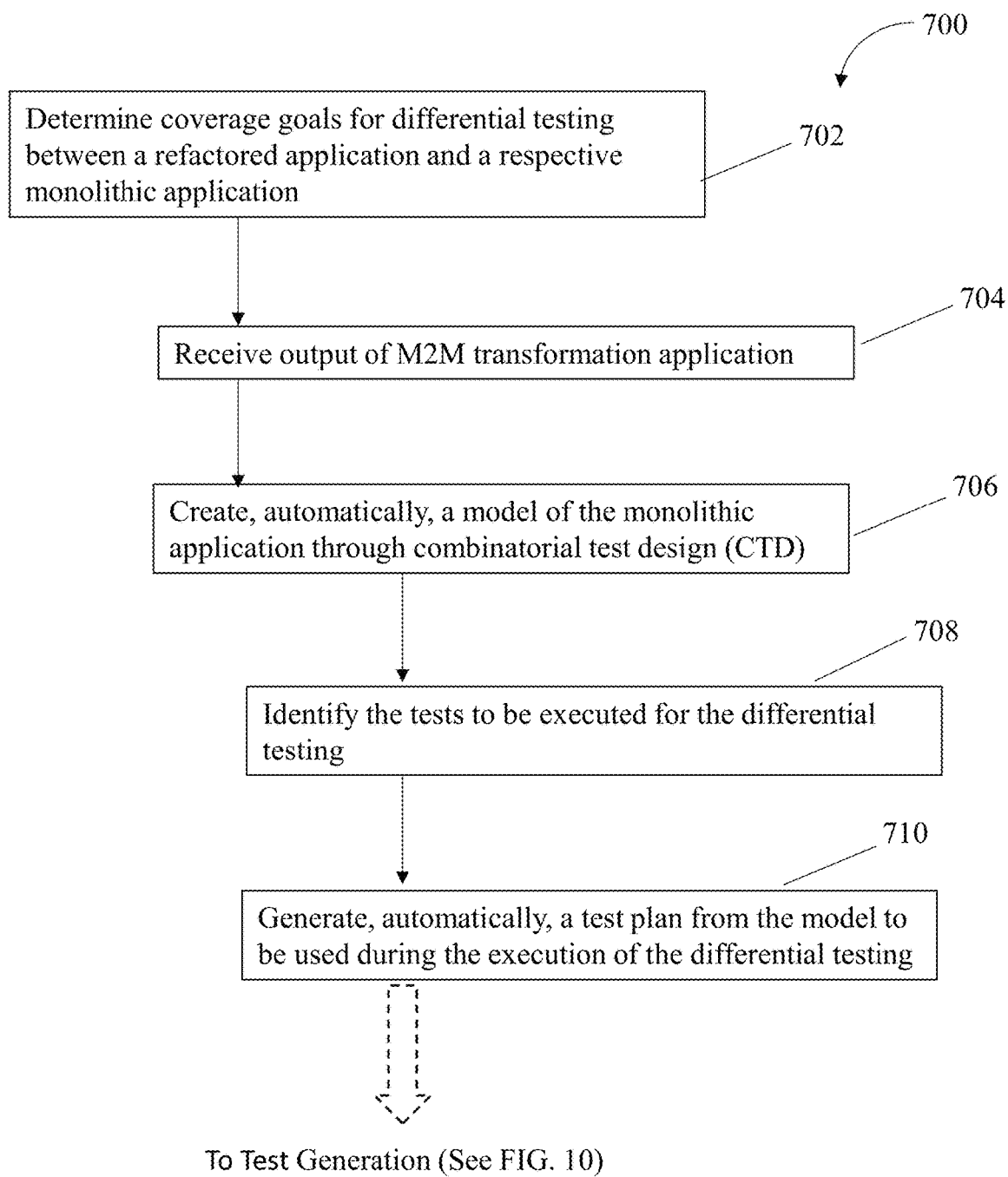
FIG. 7 is a flowchart illustrating a process for initiating validation of inter-partition communication mechanisms between refactored classes within a partitioned microservice architecture decomposed from one or more monolithic applications, in accordance with some embodiments of the present disclosure.

Referring to FIG. 6, a block diagram is presented illustrating at least a first portion 600 of the monolith-to-microservice (M2M) transformation validation engine 526 (as shown in FIG. 5A, and in FIG. 4 as 450). Referring to FIG. 7, a flowchart is provided illustrating a process 700 for initiating validation of inter-partition communication mechanisms between refactored classes A 422 and B 424 (both as shown in FIG. 4) within the partitioned microservice architecture 426 decomposed from the monolithic application 410 (both as shown in FIG. 4). Specifically, the process 700 is directed toward initiation of the validation testing directed toward validating the one or more communications channels 430 (shown in FIG. 4) that are configured for using one or more inter-partition communication protocols, e.g., and without limitation, REST APIs, to communicate between their respective partitions $P_1$ and $P_2$ (shown in FIG. 4). Also referring to FIGS. 4 and 5A through 5C, the communications channels 430 and respective REST APIs are implemented through the operation of the M2M transformation application 524 (440 in FIG. 4) to transform the monolithic application 410 into the microservices application 420. The microservices application 420 includes the refactored classes A 422 (resident in the first partition $P_1$) and B 424 (resident in the second partition $P_2$) that are substantially similar to the class A 412 and class B 414, respectively, in the monolithic application 410. The refactored classes A 422 and B 424 and the partitions $P_1$ and $P_2$ at least partially define the partitioned microservices system architecture 426. Accordingly, in some embodiments, the majority of the differential testing activities are executed through the M2M transformation validation engine 526.

In at least some embodiments, the computer systems, computer program products, and computer-implemented methods as described herein use the Java programming language (Java was developed by Oracle Corporation, Redwood, CA). However, the computer systems, computer program products, and computer-implemented methods as described herein are agnostic to the programming language used to implement them and, therefore, any programing language that enables operation of the computer systems, computer program products, and computer-implemented methods as described herein may be used. For those embodiments implemented in Java, at least a portion of the data transmissions as described herein use JSON (JavaScript Object Notation) that includes JSON syntax rules including the data being transmitted being in key/value pairs (discussed further herein). Accordingly, a JSON file includes one or more key/value pairs.

The process 700 includes determining 702 coverage goals for differential testing (as previously described herein) between the refactored application 420 and the respective monolithic application 410. In at least some embodiments, the determining operation 702 includes the M2M transformation validation engine 526 receiving 704 information in the form of an output 602 from the M2M transformation application 440 that is collected during the transformation. Such output 602 includes, without limitation, boundary method specification data 604 and proxy classes specification data 606. In addition, the refactored application code 608 is captured including, without limitation, static analysis data 610 that includes, without limitation, class hierarchical data 612 and data directed toward the parameter types 614. In some embodiments, the static analysis data 610 is captured through one or more static analysis applications (not shown) embedded within the M2M transformation application 524 (shown as 440 in FIG. 4). The static analysis 610 facilitates determining the possible parameter types 614 that may need to be tested through analyzing the internal structure of the monolithic application 410 though the source code in a non-runtime environment, i.e., without executing the monolithic application 410. The identification of the various parameter types 614 facilitates identifying the respective method signatures 616 through the parameter combinations, where each method signature, as part of the respective method declaration, includes the method name and the respective parameters. The remainder of the method declaration includes information such as, and without limitation, the return type of the method, the number and type of the arguments required by the method, and what other classes and objects can call the method.

In one or more embodiments, one or more combinatorial test design (CTD) applications 620 are resident within the M2M transformation validation engine 526, where CTD is a technology and methodology that allows writing and running much lower number of tests with higher quality and controlled risks as compared to standard testing. In general, CTD introduces a systematic and structured test design approach that is based on a test space definition in the form of parameters and their values. The optimization of the testing process through reduction of redundant tests are based on the observation that most software bugs depend on the interaction of a small number of parameters. Accordingly, a CTD algorithm selects a small subset of the test space that covers all value combinations up to a requested level, while maximizing the added value of each test in the test plan.

At least one such CTD application 620 includes a CTD model builder 622 to apply the respective CTD techniques to automatically create 706 one or more CTD models 624 from the aforementioned method signatures 616 and boundary method specification data 604. Accordingly, the CTD model builder 622 is configured to create one or more CTD models 624 of the refactored application 530 (420 in FIG. 4) at least partially based on the boundary method specifications data 604 and the method signatures 616. Each CTD model 624 facilitates generating one or more CTD test plans 630 (discussed further here). In some embodiments, feedback 640 from testing the refactored application 530 is input to the CTD model builder 622 (see FIG. 9).

Figure 8:
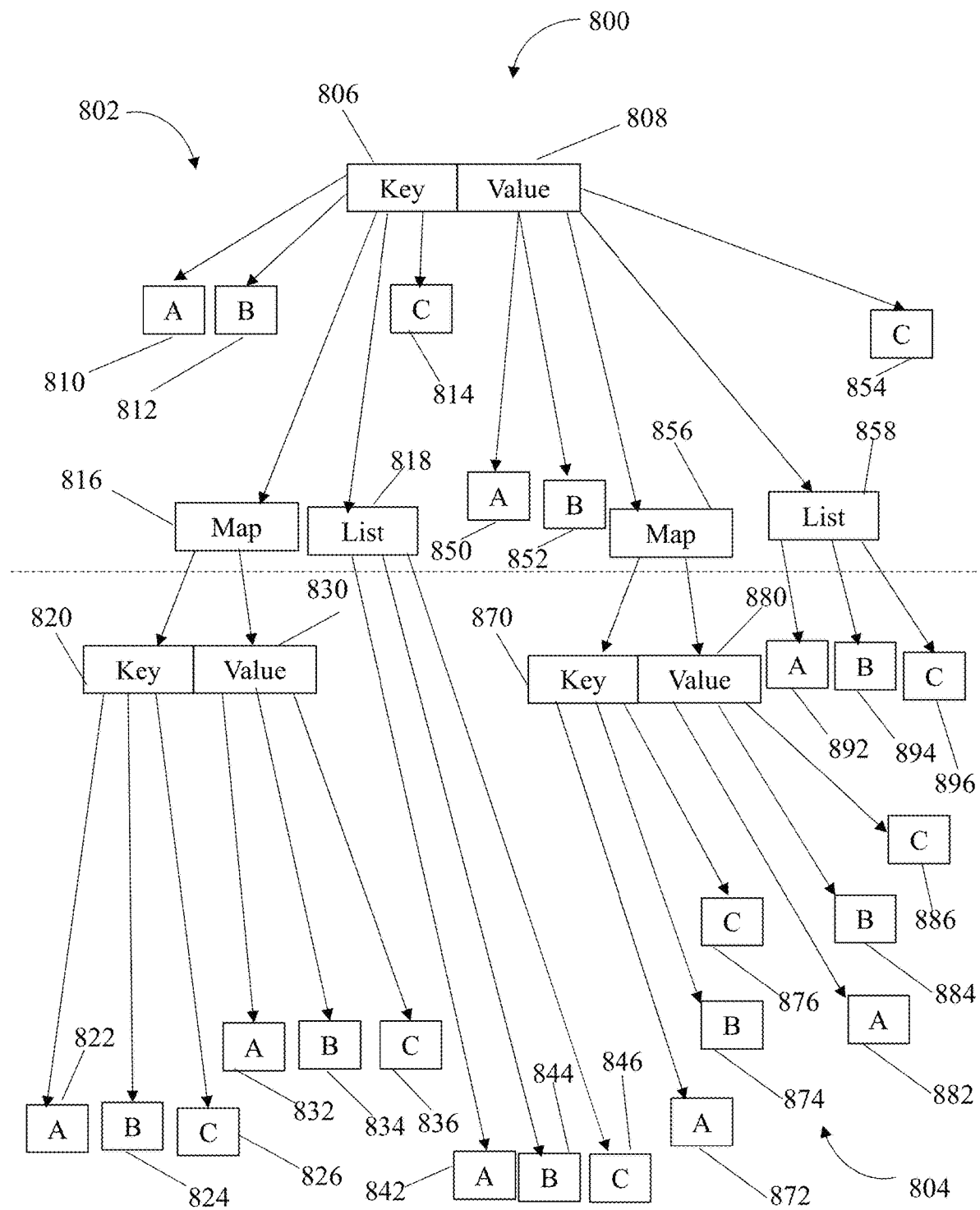
FIG. 8 is a block diagram illustrating an example of automatic on-the-fly recursive combinatorial test design (CTD) model generation, in accordance with some embodiments of the present disclosure.

Referring to FIG. 8, a block diagram is presented illustrating an example 800 of automatic on-the-fly recursive combinatorial test design (CTD) model generation to facilitate the automatic model creation operation 706 (as shown in FIG. 7) of the boundary method CTD model 624 (as shown in FIG. 6). Continuing to also refer to FIG. 6, in one or more embodiments, the CTD boundary method model 624 is configured to test both non-compound, i.e., single parameter type boundary methods and compound, i.e., multiple parameter types and multiple boundary methods together, including simultaneously, rather than one-by-one. The boundary method CTD model 624 includes one or more rows (not shown). More specifically, at least a portion of the rows resident within the CTD test plan 630 are used to generate an optimized n-way array for the number of n parameter types. Each row includes the one or more parameter types associated with a respective boundary method, i.e., each row represents the parameter types and parameters for the associated boundary method. The respective array is also resident within the respective CTD test plan 630, where the respective array is the principle component of the CTD test plan 630, and the CTD test plan 630 is discussed further below.

Also, in addition to testing at the individual method level, in some embodiments, one or more sequences of boundary method calls may be used to set up the respective states in which the respective boundary methods may be called. Therefore, the M2M transformation validation engine 526 (as shown in FIG. 5A) is configured to generate an optimized vector of parameter types for the respective boundary method invocations. The optimized vectors may be for either a single parameter type or a plurality of parameters types, i.e., compound parameter types. A general representation of the optimized vector for a compound parameter type (including a number of n parameter types) is "RetType method (ParType$_1$ param$_1$, ParType$_2$ param$_2$, . . . , ParType$_n$ param$_n$)", where the call is to define the return type ("RetType") as the method identified through the n parameter types ("ParTypex") and the respective parameters ("paramx"). A non-exhaustive catalog of such parameter types includes scaler (non-primitive) parameter types such as a user-local type, a user-remote type, and a non-user type. The parameter types may also include non-scaler parameter types such as an array of parameter types (including the aforementioned rows), a list of parameter types, and a map (discussed further herein). In addition, the parameter types may include nested scaler and non-scaler types. In some embodiments, rather than an array of parameter types and respective boundary method invocations, a hash table is used. Regardless of whether an array or hash table is used, the array or hash table facilitates mapping one or more key elements to some respective value for the respective parameter type. Accordingly, the key elements and parameter type lists may be used as at least a portion of the inputs to the boundary method CTD model 624 to generate the respective arrays.

In some embodiments, the non-compound user parameter types are represented by an attribute, i.e., field or variable that further defines the respective element, whose values are all concrete subtypes of the respective parameter types that may be optimized via type inference and/or focusing on user-local, user-remote, and non-user parameter types. The parameter subtypes maintain a relationship with all of the respective parameter types, where the subtypes are narrower is scope and inventory than the broader parameter types. In contrast to the non-compound user parameter types, i.e., for compound parameter types, a collection with all associated possible parameter types at once (intended to be executed in single test) is constructed. Also, in some embodiments, the array or list includes one base attribute (with one value) that may include all possible element. A map is at least partially based on the array or the list and includes two base attributes (each with one value) and maps all possible element types for the key and all possible element types for the value, where JSON files with the respective key/value pairs are used.

The example 800 of automatic on-the-fly recursive CTD model generation shown in FIG. 8 has a depth of 2, i.e., there is a first tier 802 and a second tier 804 of the boundary method model 624 (separated for clarity by a dashed line). The example 800 also includes a first tier key object 806 mapped to a first tier value object 808 through a list of parameter types for the respective boundary method, where the first value object 808 may be associated with different parameter types. For those embodiments that use lists, a list may include key elements such as a parameter type 810 of a first tier user class object A, a parameter type 812 of a first tier user class object B, and a parameter type 814 of a first tier user class object C. In some embodiments, there is no overlap between the parameter types 810, 812, and 814. In some embodiments, there is at least some overlap between the parameter types 810, 812, and 814. The example 800 shows additional key elements including a first tier key-map object 816 and a first tier parameter type key-list object 818 (as previously discussed). Accordingly, the key elements of the tier parameter type 810, parameter type 812, and parameter type 814 of the first tier class objects A, B, and C, respectively, the first tier key-map object 816, and the first tier parameter type key-list object 818 are attributes that are mapped to the first tier key object 806.

In general, for every case where the respective map or list is a value of the aforementioned attributes, e.g., a possible element type, new base attributes are recursively created for their element types until a predefined depth is attained. Specifically, the first tier key-map object 816 facilitates cascading the further identification of the boundary methods that are associated with the parameter types 810, 812, and 814 in the second tier 804 of the boundary method CTD model 624 in a recursive manner. A second tier key-map-key object 820 is associated with the first tier key-map object 816 as an attribute thereof and the key-map-key elements of the second tier key-map-key object 820 include the parameter type 810, parameter type 812, and parameter type 814 of second tier class objects A 822, B 824, and C 826, respectively. Accordingly, the second tier class objects A 822, B 824, and C 826 are substantially similar to, and inherited from, the first tier class objects A, B, and C, respectively, and are attributes of the second tier key-map-key object 820.

In addition, the first tier key-map object 816 facilitates cascading the identification of the boundary methods that are associated with the parameter types 810, 812, and 814 in the second tier 804 of the boundary method CTD model 624 in a recursive manner. Specifically, a second tier key-map-value object 830 is associated with the first tier key-map object 816 and the key-map-value elements of the second tier key-map-value object 830 include the parameter type 810, parameter type 812, and parameter type 814 of second tier key-map-value class objects A 832, B 834, and C 836, respectively. Accordingly, the second tier key-map-value class objects A 832, B 834, and C 836 are substantially similar to, and inherited from, the first tier class objects A, B, and C, respectively, and are attributes of the second tier key-map-value object 830.

Furthermore, the first tier key-list object 818 further facilitates identifying the boundary methods that are associated with the parameter types 810, 812, and 814 in the second tier 804 of the boundary method CTD model 624 in a recursive manner. Specifically, the first tier key-list object 818 is associated with the first tier key-map object 816 and includes the parameter type 810, parameter type 812, and parameter type 814 of second tier key-list class objects A 842, B 844, and C 846, respectively. Accordingly, the second tier key-list class objects A 842, B 844, and C 846 are substantially similar to, and inherited from, the first tier class objects A, B, and C, respectively, and are attributes of the first tier key-list object 818.

In addition to the cascading key elements as discussed with respect to the first tier key object 806, in some embodiments a similar cascade of value elements is established for the first tier value object 808. Also, similar to the cascading key elements, the list may include value elements such as the parameter type 810 of a first tier user class object A 850, the parameter type 812 of a first tier user class object B 852, and the parameter type 814 of a first tier user class object C 854. The example 800 shows additional value elements including a first tier value-map object 856 and a first tier parameter type value-list object 858. The value elements of the parameter type 810, parameter type 812, and parameter type 814 of the first tier class objects A 850, B 852, and C 854, respectively. Accordingly, the first tier value-map object 856, and the first tier parameter type value-list object 858 are attributes that are mapped to the first tier value object 808.

The first tier value-map object 856 facilitates cascading the further identification of the boundary methods that are associated with the parameter types 810, 812, and 814 in the second tier 804 of the boundary method CTD model 624 in a recursive manner. Specifically, a second tier value-map-key object 870 is associated with the first tier value-map object 856 and the value-map-key elements of the second tier value-map-key object 870 include the parameter type 810, parameter type 812, and parameter type 814 of second tier class objects A 872, B 874, and C 876, respectively. Accordingly. the second tier class objects A 872, B 874, and C 876 are substantially similar to, and inherited from, the first tier class objects A, B, and C, respectively, and are attributes of the first tier value-map key object 870.

In addition, the first tier value-map object 856 facilitates cascading the identification of the boundary methods that are associated with the parameter types 810, 812, and 814 in the second tier 804 of the boundary method CTD model 624 in a recursive manner. Specifically, a second tier value-map-value object 830 is associated with the first tier value-map object 856 and the value-map-value elements of the second tier key-map-value object 880 include the parameter type 810, parameter type 812, and parameter type 814 of second tier value-map-value class objects A 882, B 884, and C 886, respectively. Accordingly, the second tier key-map-value class objects A 882, B 884, and C 886 are substantially similar to, and inherited from, the first tier class objects A, B, and C, respectively, and are attributes of the first tier value-map-value object 880.

Furthermore, the first tier value-list object 858 further facilitates identifying the boundary methods that are associated with the parameter types 810, 812, and 814 in the second tier 804 of the boundary method CTD model 624 in a recursive manner. Specifically, the first tier value-list object 858 is associated with the first tier value-map object 856 and includes the parameter type 810, parameter type 812, and parameter type 814 of second tier value-list class objects A 892, B 894, and C 896, respectively. Accordingly, the second tier value-list class objects A 892, B 894, and C 896 are substantially similar to, and inherited from, the first tier class objects A, B, and C, respectively, and are attributes of the first tier value-list object 858.

The CTD model builder 622 automatically uses combinatorial testing techniques for each boundary method to model the space of the set of optimized compound vectors that are automatically generated with the full range of parameter types 806, 808, and 810 associated with user class objects A, B, and C, where each vector assigns a specific concrete type to each of the parameters. Furthermore, multiple tests may be developed for each possible combination of the parameter types that will result in a unique vectorial combination, where the static analysis 610 is instrumental in identifying the full range of parameter types. In addition, the automated on-the-fly recursive combinatorial test design (CTD) model generation, i.e., the model creation operation 706 automatically detects the boundary methods within the refactored application 526, and if a particular parameter type is not declared, i.e., not listed or mapped, it is not analyzed in the respective model space. Accordingly, the model creation operation 706 is unique for differing refactored applications 526 and is agnostic to the differing natures of the varying refactored applications 526.

As a portion of the creating the model operation 706, the CTD techniques also identify 708 the tests that are most likely to expose defects in the refactored application 524, and then uses advanced mathematics to dramatically reduce the number of test cases while ensuring optimum coverage of the conditions and the interactions of the variables within the refactored application 530. Therefore, a significant portion of overlapping and redundant testing is not executed, thereby enhancing the efficiency and timeliness of the differential testing while minimizing any negative impact on the scope of the testing. Accordingly, one or more CTD test plans 630 are generated 710, automatically, from the respective CTD model 624 through the M2M transformation validation engine 526.

In at least some embodiments, the coverage goals created through the determination operation 702 includes specifying a constructor (not shown) as a coverage goal, where a constructor is a special method that is used to initialize objects that are called when an object of a class is created. The constructor may also be used to set initial values for the objects' attributes through the respective parameters. For example, and without limitation, each proxy method, i.e., each boundary method of the refactored application 530 will be tested through one or more optimized vectors of the respective parameters (as discussed further herein). In some embodiments, at least a portion of the boundary methods will be tested multiple times with each vector combination being slightly different than the others, including, without limitation, different sets of parameter types 614. In addition, the test coverage includes those classes that inherit properties from other classes, and such inheritable parameters are also used to test the respective boundary methods of the affected classes. Furthermore, in some embodiments, the refactored application 524 includes classes that are defined by the refactored application 530 during runtime and the CTD test plans 630 include those classes as well. In addition to testing the refactored application 530, the test goals will include those goals directed toward testing the monolithic application 410. Accordingly, the test coverage goals for validating the refactored application 530 are automatically generated 702 by the one or more CTD applications 620 resident within the M2M transformation validation engine 526 at least partially as a function of the parameter types 614 (both actual and possible) rather than merely as a function of the lines of refactored application code 608 and the various elements thereof such as specific methods and calls.

Figure 9:
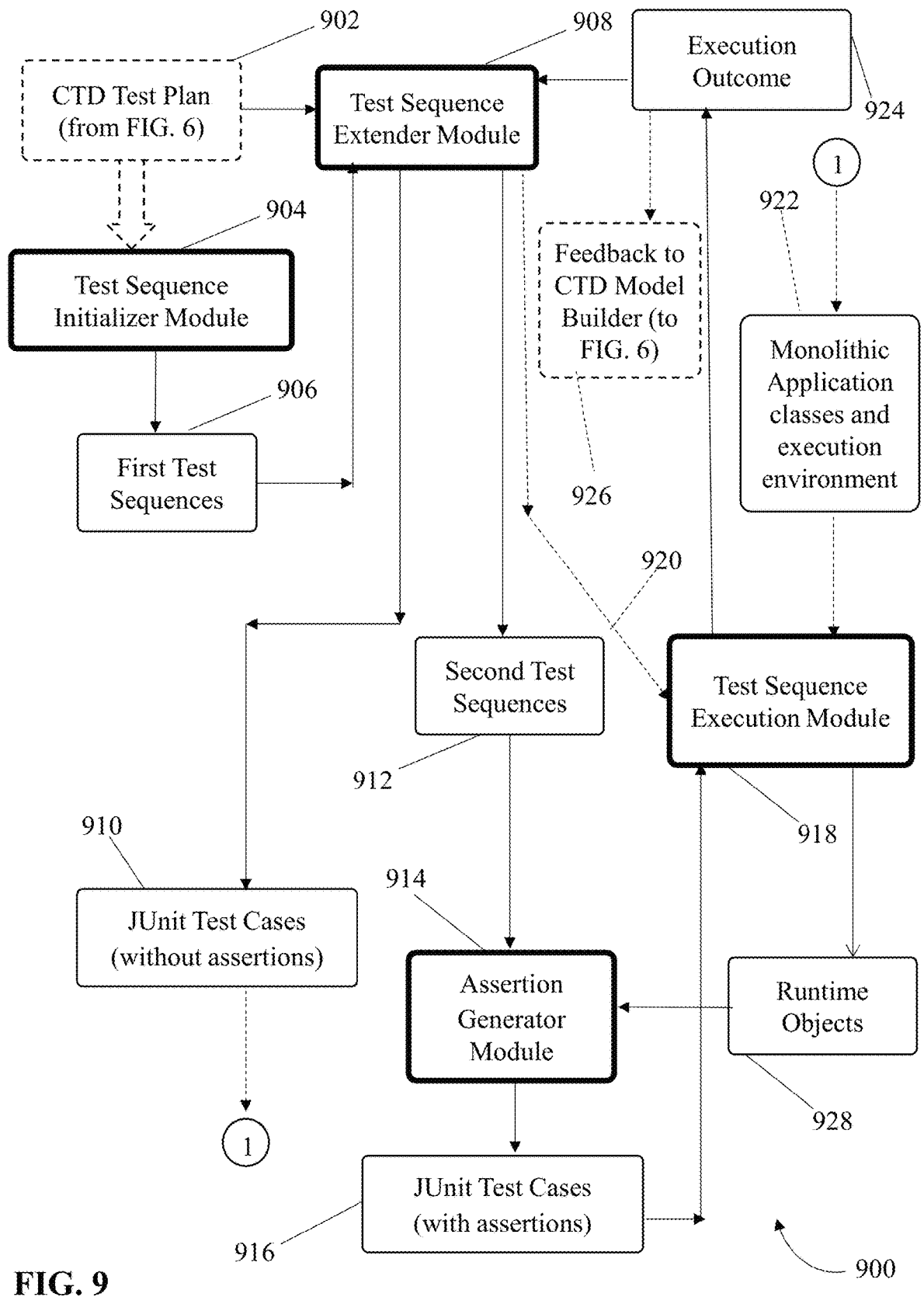
FIG. 9 is a block diagram illustrating at least a second portion of a monolith-to-microservice (M2M) transformation validation engine, in accordance with some embodiments of the present disclosure.
Figure 10:
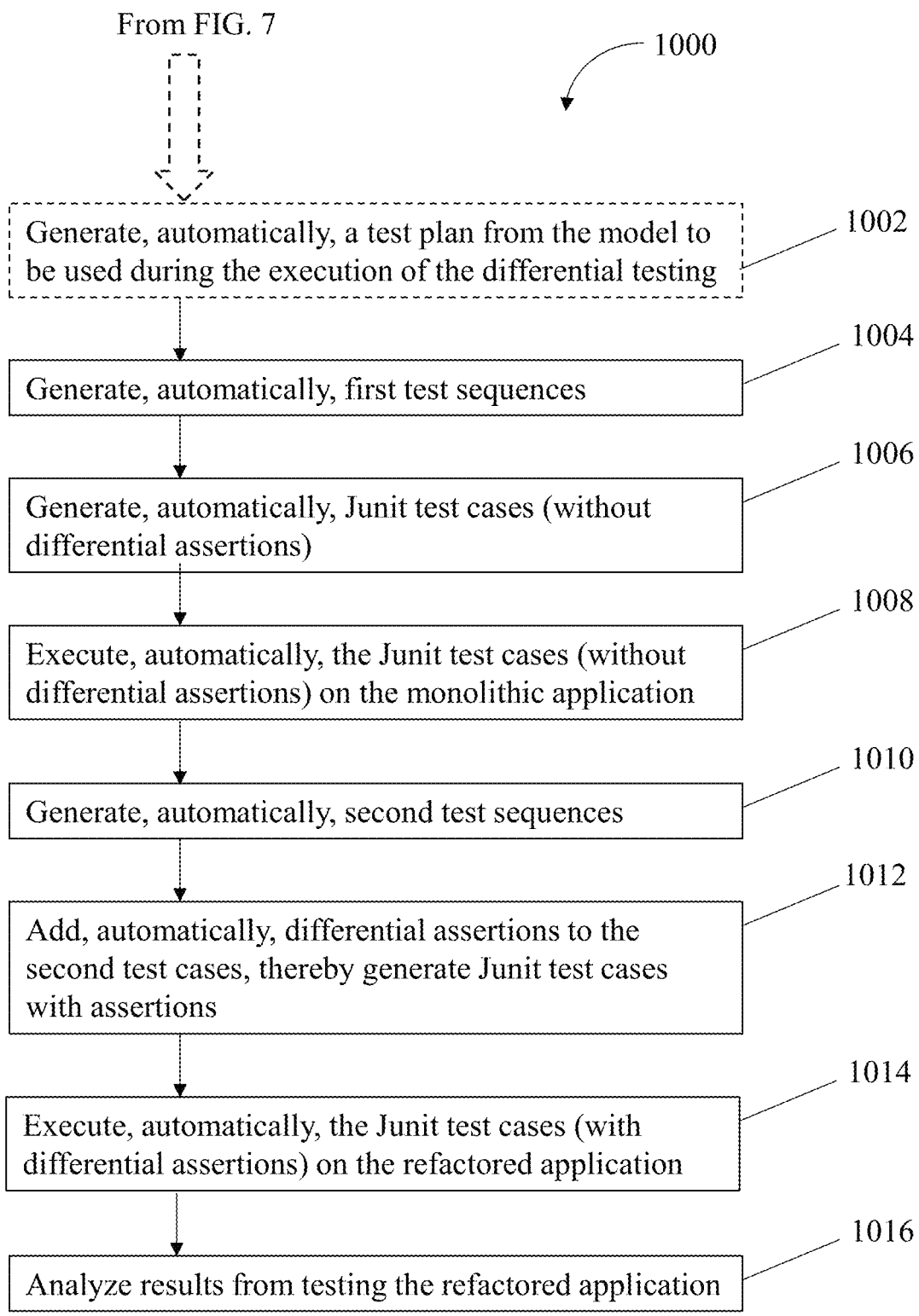
FIG. 10 is a flowchart illustrating a process for generating and executing validation tests to be employed on inter-partition communication mechanisms between refactored classes within a partitioned microservice architecture decomposed from one or more monolithic applications, in accordance with some embodiments of the present disclosure.

Upon completion of the test plan generation operation 710, including the model creation operation 706, test generation through a test generator is executed as further discussed herein with respect to FIGS. 9 and 10. Since most, if not all, of the parameter types for most of, if not all, the boundary methods are identified including their respective interrelationships with each other, the automated modeling 706 of the refactored application 530, and the subsequent test generation, is thereby facilitated. The test generator component takes the CTD model 624 and translates it into instructions for the test generator to create a map object with a structure similar to that shown in FIG. 8.

Referring to FIG. 9, a block diagram is presented illustrating at least a second portion 900 of the M2M transformation validation engine 526 (as shown in FIG. 5A, and in FIG. 4 as 450). Referring to FIG. 10, a flowchart is provided illustrating a process 1000 for generating and executing validation tests to be employed on inter-partition communication mechanisms between refactored classes A 422 and B 424 (both as shown in FIG. 4) within a partitioned microservice architecture 426 decomposed from the monolithic application 410 (both as shown in FIG. 4). Specifically, the process 1000 is directed toward executing the validation testing directed toward validating the one or more communications channels 430 (shown in FIG. 4) that are configured for using one or more inter-partition communication protocols, e.g., and without limitation, REST APIs, to communicate between their respective partitions $P_1$ and $P_2$ (shown ion FIG. 4). Also referring to FIGS. 4, 5A through 5C, 6, and 7, the communications channels 430 and respective REST APIs are implemented through the operation of the M2M transformation application 524 (440 in FIG. 4) to transform the monolithic application 410 into the refactored application 530 (shown as 420 in FIG. 4). The refactored application 530 includes the refactored classes A 422 (resident in the first partition $P_1$) and B 424 (resident in the second partition $P_2$) that are substantially similar to the class A 412 and class B 414, respectively, in the monolithic application 410. The refactored classes A 422 and B 424 and the partitions $P_1$ and $P_2$ at least partially define the partitioned microservices system architecture 426. In some embodiments, the majority of the differential testing activities are executed through the M2M transformation validation engine 526.

The second portion 900 of the M2M transformation validation engine 526 as shown in FIG. 9 is a continuation of FIG. 6, i.e., a continuation of the first portion 600 of the M2M transformation validation engine 526. FIG. 9 shows a test generator, where hereon the second portion 900 is referred to as the test generator 900. The test generator 900 receives the CTD test plan 902 (shown as 630 in FIG. 6). Similarly, FIG. 10 is a continuation of FIG. 7 and includes the automatic test plan generation operation 1002 (shown as 710 in FIG. 7).

In at least some embodiments, the test generator 900 includes a test sequence initializer module 904 that is configured to generate 1004, automatically, a plurality of first test sequences 906 through creating basic block sequences, i.e., sequences of code statements, including, without limitation, method calls, variable assignments, and varying code states. With the previously described collection of known boundary methods in the refactored application 530 and the previously described collection of known parameter types in the refactored application 530, the first test sequences 906 are generated 1004 to test each identified boundary method and parameter type. The first test sequences 906 are generated 1004 through one or more automatic test generator (ATG) applications, also referred to as automatic test generators (ATGs), such as, and without limitation, open source tools Randoop and EvoSuite. The respective ATG applications are configured to automatically generate 1004 unit tests for respective classes, and their respective boundary methods and parameter types, in JUnit format. In some embodiments, the ATG applications are embedded within the M2M transformation validation engine 526 that are accessed when called. In some embodiments, the ATG applications are stand-alone applications. The first test sequences 906 are automatically generated 1004 through feedback-directed random test generation. The respective first test sequences 906 are generated 1004 from implementing the CTD test plans 630 and are configured for exercising the serialization/deserialization behavior for each respective boundary method.

In one or more embodiments, for each row of the CTD test plan 902, and for each parameter type in the respective rows, a constructor of the respective parameter types is specified through the coverage goals determined 702 as described with respect to FIG. 7. Each constructor facilitates generating each respective first test sequence 906 through creating the respective receiver object and parameter objects. In at least some embodiments, test sequences leading to object creation are reused through placing the block sequences in a block sequence pool. For example, and without limitation, certain test sequences that create certain objects may be configured to use a particular parameter type that is used with more than one boundary method. Under such circumstances, a particular test sequence may be used multiple times to create the parameter type for each of the respective boundary methods. Those test sequences that create the respective objects may be pooled to facilitate the ease of reuse.

As a portion of generating the first test sequence 906, a sub-sequence of the respective first test sequence 906 that creates the receiver object is identified, where the respective sub-sequences and the first test sequences 906 are initially separated from each other. If the respective first test sequence 906 cannot be generated within a predetermined time bound, the respective row will be marked as uncovered and the first test sequences generation operation 1004 will continue to the next row. If the respective first test sequence 906 can only be partially generated due to, e.g., and without limitation, hash collisions associated with the respective map, the uncovered elements are recorded.

The differential testing techniques as described herein are executed to compare behaviors of the refactored application 530 against behaviors of the monolithic application 410. Therefore, the monolith application 410 is tested first. In general, a row is first tested in the monolithic application 410 to determine the behavior of the respective method calls and the same row is tested in the refactored application 530 to facilitate determining the proper, or improper, operation of the respective boundary methods through comparison with the respective operation of the method calls. The CTD test plan 902 is stepped through row-by-row until all of the rows therein are exhausted.

Specifically, in some embodiments, the test generator 900 includes a test sequence extender module 908 that is configured to generate 1006, automatically, Junit test cases 910 without differential assertions through the respective ATG application for testing the monolithic application 410. The Junit test cases 910 are configured for unit level testing of specific classes in the monolithic application 410. The test sequence extender module 908 extends the first test sequences 906 with the respective sub-sequences associated with receiver object generation, thereby completing the test sequence for the respective row.

In at least some embodiments, the Junit test cases 910 (without the differential assertions) are executed 1008 automatically on the monolithic application 410. A first test sequence associated with a first row of the CTD test plan 902 is executed on the respective method call of the monolithic application 410 that corresponds to the boundary method of the refactored application 530 to be tested. The test sequence extender module 908 generates Junit test cases 910 for testing the monolithic application 410, where the Junit test cases 910 do not include assertions. If the operational test of the method call is successfully completed, the receiver state is recorded. If the operational test of the method call is not successfully completed, the respective row is discarded and not tested. A failed test of the respective row in the monolithic application 410 indicates that a similar test of the refactored application 530 will also fail, and such a test case will not be necessary and will be avoided. In at least some embodiments, the tests of the individual rows is conducted at the individual method level. Also, in some embodiments, a sequence of method calls is used to set up a state in which the method may be called.

In addition to generating 1006 the Junit test cases 910 for testing the monolithic application 410, the test sequence extender module 908 is also configured to automatically generate 1010 the second test sequences 912 that will be used to test the refactored application 530. As described above for generating the Junit test cases 910, the test sequence extender module 908 uses the ATG application to assemble the basic block sequences into the second test sequences 912 that will be used to test the boundary methods and the specific parameter types thereof. As described above, certain test sequences that create objects associated with a parameter type that is associated with multiple boundary methods may be selected from a test sequence pool to facilitate testing efficiency. The test sequence extender module 908 analyzes each row of the CTD test plan 902 on a row-by-row basis to determine the respective boundary method and the associated parameter types and generate the appropriate second test sequence 912. In general, in some embodiments, each second test sequence 912 is unique, including those parameter combinations that may return different results. Also, in some embodiments, one or more rows of the CTD test plan 902 may not be tested. Furthermore, in some embodiments, if a particular second test sequence 912 is configured to call more than one boundary method, an optimization feature includes using certain test sequences to test all of the boundary methods with that particular test sequence rather than executing the boundary method tests one row at a time through a single use of the test sequence.

In at least some embodiments, the test generator 900 also includes an assertion generator module 914 that is configured to automatically add 1012 differential assertions to the second test sequences 912 to generate Junit test cases 916 with assertions. Insertion of assertions into the second test sequences 912 is one mechanism that facilitates capturing the behavior of the refactored application 530 as the test of each boundary method is conducted. The assertions facilitate detecting defects and deviations from expected behavior as captured by the testing of the respective row with the monolithic application 410. Such deviations may include aborts, exceptions, and assertion failures. In some embodiments, the assertions are added through the aforementioned ATG application. In some embodiments, the assertions may be added through another application such as, and without limitation, a test oracle. i.e., an application that is configured to determine whether a test has passed or failed. In some embodiments, the assertions may be added in the form of developer-written tests. If the boundary method is a constructor, the assertion will be added to check that an object with a respective identification tag exists in the object map of the refactored application 530. In addition, assertions may be used to compare the state of a remote object with a particular receiver state. The addition of assertions to the second test sequences 912 facilitates inspections and capturing of the states of the objects resident within the refactored application 530 through a dynamic analysis. Accordingly, the Junit test cases 916 with the assertions are used to test the refactored application 520.

In one or more embodiments, the test generator 900 further includes a test sequence execution module 918 that is configured to receive the Junit test cases 916 that are used to test the refactored application 530 and manage the execution of the Junit test cases 916. Therefore, the Junit test cases 916 with the differential assertions are executed 1014 automatically on the refactored application 530. In addition, is some embodiments, the test sequence execution module 918 includes test mapping features to facilitate documenting the results of the tests and mapping the objects within the refactored application 530. In addition, in some embodiments, the test sequence execution module 918 is further configured to receive a candidate extended test sequence 920 associated with the test sequence extender module 908. In some embodiments, the test sequence execution module 918 receives monolithic application classes and execution environment information 922 based on the results from the execution of the Junit test cases 910. The test sequence extender module 908 interacts with the test sequence execution module 918 to determine whether the candidate extended test sequence 920 executes successfully on the monolithic application 410. Candidate extended sequences that do not execute successfully are discarded by the test sequence extender module 908 and not included in the generated Junit test cases 910 and 916.

As previously discussed, successful completion of the Junit test cases 910 on the monolithic application 410 is recorded, as is every statement that is being executed during such testing, where the state of the created objects is also recorded. Similarly, as the Junit test cases 916 are executed to test the refactored application 530, the results of such execution, i.e., the execution outcome 924. For example, and without limitation, as the Junit test cases 916 are executed, and in addition to the pass/fail results, every statement that is being executed is recorded and the state of the refactored application 530, including the respective created objects, will be recorded after every such respective statement. In addition, the assertions embedded within the JUnit test cases 916 facilitate capturing the respective execution outcome 924 of the Junit test cases 916, including, without limitation, failures and exceptions. In addition, differences between the execution of the Junit test cases 910 on the monolithic application 410 and the execution of the Junit test cases 916 on the refactored application are recorded. The execution outcome 924 is transmitted to the test sequence extender module 908 as a feedback mechanism, where the associated test data may be used to define the second test sequences 912 that are generated for the next row subsequent to the present row being tested.

In one or more embodiments, runtime objects 928 are objects created during the execution of the tests. The generated JUnit test cases 910 (without assertions) are executed on the monolith application 410, and the values of the runtime objects 928 created as a result of such testing are recorded as first values. In some embodiments, the recorded values may be inserted as assertions to the generated JUnit test cases 916 for the refactored application 530. Then, when the respective JUnit test cases 916 are executing on the refactored application 530, values will also be recorded as second values. The first values are compared with the second values with the desire for the first and second values to be essentially similar, thereby indicating that the respective functionalities are substantially equivalent between the monolithic application 410 and the refactored application 530. If a difference between the first and second values exceeds a threshold, i.e., sufficiently different first and second values are created to indicate less than satisfactory functional equivalence between the respective portions of the monolithic application 410 and the refactored application 530, the results of the respective JUnit test case 916 will indicate an assertion failure, thereby indicating an anomaly requiring further investigation.

In addition to recording the data associated with the tests that were run on the refactored application 530, the execution outcome 924 includes data associated with the tests that were not run, i.e., those boundary methods and parameter types not tested. Such conditions may be developed if the bulk of the testing is performed from a map, since, in contrast to lists, the map structure may not be conducive to capturing all items to be tested. Accordingly, feedback 926 (shown as 640 in FIG. 6) is transmitted to the CTD model builder 622, where a new set of vectors may be generated to test those portions of the refactored application 530 that are known to have been missed.

In one or more embodiments, the process 1000 for generating and executing validation tests on the refactored application 530 includes analyzing 1016 the differential test results to determine the differences between the refactored application 530 and the monolithic application 410 through the differential assertions employed as previously described. As previously described, the execution 1014 of the testing of each row of the n-way array resident within the CTD test plan 902, where each row is associated with the respective boundary method and parameter types, follows testing the related method call and parameter types in the monolithic application 410. Therefore, the analysis 1016 of the test results includes a comparison with the monolithic application 410 to determine the validity of the inter-partition communications mechanisms within the refactored application 530 and the functional equivalence between the method calls of the monolithic application 410 and the boundary methods of the refactored application 530. Accordingly, the preferred outcome is that the refactored application 530 is "bug-free" and the transition to the partitioned microservices system architecture 426 maintains the original functionality of the monolithic application 410.

The analyzing operation 1016 includes classifying any failures that may have been experienced. Those boundary methods that pass the differential testing are maintained within the refactored application 520 and those that fail are discarded, where the test team will determine how to proceed. In some embodiments, the results of the analysis operation 1016 includes providing a probability value that indicates the correlation between the monolithic application 410 and the refactored application 530 with respect to functionality, i.e., a confidence that the refactored application 530 is functionally equivalent to the original monolithic application 410. In some embodiments, any scheme for measuring the confidence level is used that enables operation of the M2M transformation validation engine 526 as described herein, e.g., and without limitation, 0% to 100%, where 100% indicates a complete transfer of the respective operability.

As previously described, the specific test coverage goals of the differential testing are established prior to executing the testing. However, one high-level goal is to generate differential tests with the highest coverage feasible. For example, and without limitation, one goal may include providing test coverage of all of the optimized vectors and such coverage establishes approximately 90% of all of the vectors to be tested. Similarly, code coverage may also be analyzed such that a majority of the code is covered through the differential testing. As the number of items covered through the differential testing increase, regardless if the measurements include lines of code, vectors, boundary methods, and parameter types, or a combination thereof, then the confidence level may increase accordingly. In addition, if there are no deficiencies noted, i.e., all the test cases pass, from the differential testing, the confidence level will approach 100%. If certain test cases fail, the root cause of the failures may be examined and corrected such that the differential testing may be reperformed.

The system, computer program product, and method as disclosed herein facilitates overcoming the disadvantages and limitations of known methods for validating the inter-partition communication mechanisms between refactored classes within a partitioned microservice architecture decomposed from one or more monolithic applications. Specifically, the present disclosure describes an automated process and system to efficiently and effectively facilitate migration of monolithic applications to cloud architectures. Specifically, the present disclosure describes an improvement to post-partitioning validation of the partitioned application, which is a critical missing portion of known end-to-end application transformations. As described herein, the validation process is automated, thereby decreasing the manual efforts required to implement the testing, an important feature for numerous and large application migrations. Furthermore, to optimize the computing resources used to execute the differential testing for validation, test sequences used for creating objects for parameter types that are associated with multiple boundary methods for the validation testing may be pooled for subsequent reuse. In addition, further optimization is achieved through testing compound combinations of boundary methods together, rather than one-by-one, to further decrease the testing time.

In addition, the system, computer program product, and method as disclosed herein leverage a substantially automated end-to-end testing and validation processes. For example, automated assertion generation and insertion into the test sequences automatically generated for performing the combinatorial differential validation testing on the refactored application are executed to execute tests for exercising the serialization/deserialization behavior for each boundary method. Moreover, the system, computer program product, and method as disclosed herein facilitates higher test quality than known methods because its coverage targets code parts that have changed during refactoring of the monolithic application. Also, the processes described herein are agnostic to the differing natures of the varying refactored applications and the programming language used to implement them. Accordingly, significant improvements to the conduct of differential testing systems and methods between two applications are realized through the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system that comprises:
a partitioned computing architecture comprising a plurality of partitions, wherein each partition of the plurality of partitions comprises one or more processing devices and at least one memory device operably coupled to the one or more processing devices, the one or more processing devices are configured to:
analyze a monolithic application in a non-runtime environment and therefrom determining parameter types to be tested;
automatically create a combinatorial test design (CTD) model, wherein one or more coverage objects includes one or more combinations of a plurality of parameter types;
automatically generate, the one or more of combinations of the plurality of parameter types; and induce a plurality of different return types; wherein each return type of the plurality of different return types is induced as a function of a respective combination of the plurality of parameter types;
automatically generate, for each boundary method in one or more boundary methods, an optimized vector of parameter types configured to execute a boundary method invocation;
automatically generate one or more test sequences for a validation test of one or more functional behaviors executed by a refactored application after transformation from a monolithic application for each boundary method of one or more boundary methods; and
execute the validation test on at least a portion of the refactored application that has been transformed from the monolithic application, wherein the refactored application is resident within the partitioned computing architecture and is configured to communicate between the partitions based upon the one or more boundary methods, and the refactored application is at least partially similar to the monolithic application, wherein the validation test is configured to compare portions of the monolithic application with the refactored application.

2. The computer system of claim 1, the one or more processing devices are further configured to: automatically generate one or more test sequences for exercising one or more of serialization and deserialization behaviors for each boundary method of the one or more boundary methods.

3. The computer system of claim 1, the one or more processing devices are further configured to: automatically generate one or more test sequences simultaneously for single parameter type and multiple parameter types.

4. The computer system of claim 1, wherein the parameter types comprise scaler parameter types.

5. The computer system of claim 1, wherein the one or more processing devices are further configured to: generate an n-way covering array from the CTD model, wherein: the n-way covering array includes a plurality of rows therein, each row of the plurality of rows is at least partially representative of one or more parameter types of the plurality of parameter types.

6. The computer system of claim 5, wherein the one or more processing devices are further configured to one or more of: generate a plurality of Junit test cases from the n-way covering array through one or more automatic test generators; and test a plurality of boundary methods of the one or more boundary methods together.

7. The computer system of claim 5, wherein the one or more processing devices are further configured to: place a plurality of block sequences within a block sequence pool; and reuse one or more block sequences of the plurality of block sequences to use a parameter type of the plurality of parameter types with more than one boundary method of the one or more boundary methods.

8. A computer program product, the computer program product comprising: one or more computer readable storage media; and program instructions collectively stored on the one or more computer readable computer readable storage media and configured to, the program instructions comprising:
analyze a monolithic application in a non-runtime environment and therefrom determining parameter types to be tested;
automatically create a combinatorial test design (CTD) model, wherein one or more coverage objects includes one or more combinations of a plurality of parameter types;
automatically generate, the one or more of combinations of the plurality of parameter types; and induce a plurality of different return types; wherein each return type of the plurality of different return types is induced as a function of a respective combination of the plurality of parameter types;
automatically generate, for each boundary method in one or more boundary methods, an optimized vector of parameter types configured to execute a boundary method invocation;
automatically generate one or more test sequences for a validation test of one or more functional behaviors executed by a refactored application after transformation from a monolithic application for each boundary method of one or more boundary methods; and
execute the validation test on at least a portion of the refactored application that has been transformed from the monolithic application, wherein the refactored application is resident within the partitioned computing architecture the comprises a plurality of partitions and is configured to communicate between the partitions based upon the one or more boundary methods, and the refactored application is at least partially similar to the monolithic application, wherein the validation test is configured to compare portions of the monolithic application with the refactored application.

9. A computer-implemented method comprising:
analyzing a monolithic application in a non-runtime environment and therefrom determining parameter types to be tested;
automatically creating a combinatorial test design (CTD) model, wherein one or more coverage objects includes one or more combinations of a plurality of parameter types;
automatically generating, the one or more of combinations of the plurality of parameter types; and induce a plurality of different return types; wherein each return type of the plurality of different return types is induced as a function of a respective combination of the plurality of parameter types;
automatically generating, for each boundary method in one or more boundary methods, an optimized vector of parameter types configured to execute a boundary method invocation;
automatically generating one or more test sequences for a validation test of one or more functional behaviors executed by a refactored application after transformation from a monolithic application for each boundary method of one or more boundary methods; and
executing the validation test on at least a portion of the refactored application that has been transformed from the monolithic application, wherein the refactored application is resident within the partitioned computing architecture including a plurality of partitions and communication between the partitions uses one or more boundary methods, and the refactored application is at least partially similar to the monolithic application, wherein the validation test is configured to compare portions of the monolithic application with the refactored application.

10. The method of claim 9, wherein automatically generating the one or more test sequences comprises:
automatically generating one or more test sequences for exercising one or more of serialization and deserialization behaviors for each boundary method of the one or more boundary methods.

11. The method of claim 9, wherein automatically generating the one or more test sequences comprises:
automatically generating one or more test sequences for: testing each boundary method of the one or more boundary methods individually; and generating a sequence of boundary method calls, thereby setting up a state in which at least one boundary method of the one or more boundary is called.

12. The method of claim 9, wherein the parameter types comprise scalar parameter types.

13. The method of claim 9, further comprising:
generating an n-way covering array from the CTD model, wherein:
the n-way covering array includes a plurality of rows therein, each row of the plurality of rows is at least partially representative of one or more parameter types of the plurality of parameter types.

14. The method of claim 13, further comprising:
generating a plurality of Junit test cases from the n-way covering array through one or more automatic test generators; and
testing a plurality of boundary methods of the one or more boundary methods together.

15. The method of claim 13, further comprising:
placing a plurality of block sequences within a block sequence pool; and
reusing one or more block sequences of the plurality of block sequences to use a parameter type of the plurality of parameter types with more than one boundary method of the one or more boundary methods.

16. The method of claim 14, further comprising:
executing a first Junit test case on the monolithic application;
recording a first value associated with the execution of the first Junit test case;
inserting the first value into an assertion;
inserting the assertion into a second Junit test case;
executing the second Junit test case on the refactored application;
recording a second value associated with the execution of the second Junit test case;
comparing the first value and the second value;
determining a difference between the first value and the second value exceeds a threshold; and
indicating an assertion failure.

* * * * *